(12) United States Patent
Xu et al.

(10) Patent No.: US 12,367,432 B2
(45) Date of Patent: Jul. 22, 2025

(54) METHOD, SYSTEM, AND COMPUTER PROGRAM PRODUCT FOR ENSEMBLE LEARNING WITH REJECTION

(71) Applicant: Visa International Service Association, San Francisco, CA (US)

(72) Inventors: Hao Xu, Danville, PA (US); Chiranjeet Chetia, Round Rock, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/845,907

(22) PCT Filed: May 15, 2024

(86) PCT No.: PCT/US2024/029345
§ 371 (c)(1),
(2) Date: Sep. 11, 2024

(87) PCT Pub. No.: WO2024/242942
PCT Pub. Date: Nov. 28, 2024

(65) Prior Publication Data
US 2025/0131340 A1  Apr. 24, 2025

Related U.S. Application Data

(60) Provisional application No. 63/503,294, filed on May 19, 2023.

(51) Int. Cl.
*G06N 3/12* (2023.01)
*G06N 20/20* (2019.01)

(52) U.S. Cl.
CPC .............. *G06N 20/20* (2019.01); *G06N 3/12* (2013.01)

(58) Field of Classification Search
CPC ................................ G06N 20/20; G06N 3/12
See application file for complete search history.

(56) References Cited

U.S. PATENT DOCUMENTS

| 2012/0191635 | A1 | 7/2012 | Bigio et al. |
| 2016/0042292 | A1* | 2/2016 | Caplan .................. G06N 20/20 706/12 |

FOREIGN PATENT DOCUMENTS

| CN | 114169448 A | 3/2022 |

OTHER PUBLICATIONS

Homenda et al ("Global, Local and Embedded Architectures for Multiclass Classification with Foreign Elements Rejection: an Overview" 2015) (Year: 2015).*

(Continued)

*Primary Examiner* — Lut Wong
(74) *Attorney, Agent, or Firm* — The Webb Law Firm

(57) ABSTRACT

Methods, systems, and computer program products are provided for ensemble learning. An example system includes at least one processor configured to: (i) generate a rejection region for each baseline model of a set of baseline models (ii) generate a global rejection region based on the rejection regions of each baseline model; (iii) train an ensemble machine learning model; (iv) update, based on a baseline model predictive performance metric for each baseline machine learning model, the set of baseline machine learning models; and (iv) repeat (i)-(iv) until there is a single baseline model in the set of baseline models or a predictive performance or global acceptance ratio of the ensemble model satisfies a threshold.

20 Claims, 16 Drawing Sheets

(56) References Cited

OTHER PUBLICATIONS

Dos Santos et al., "A dynamic overproduce-and-choose strategy for the selection of classifier ensembles", Pattern recognition, 2008, pp. 2993-3009, vol. 41.
Jiao et al., "Dynamic Ensemble Selection for Imbalanced Data Streams with Concept Drift", IEEE Transactions on Neural Networks and Learning Systems, 2024, vol. 35, No. 1.
Altmann et al., "Permutation importance: a corrected feature importance measure", Bioinformatics, 2010, pp. 1340-1347, vol. 26(10).
Bao et al., "CNN Confidence Estimation for Rejection-Based Hand Gesture Classification in Myoelectric Control", IEEE Transactions on Human-Machine Systems, 2022, pp. 99-109, vol. 52(1).
Breiman, "Bagging Predictors", Machine Learning, 1996, pp. 123-140, vol. 24.
Britto Jr. et al., "Dynamic selection of classifiers—A comprehensive Review", Pattern Recognition, 2014, pp. 1-16.
Caruana et al., "Ensemble Selection from Libraries of Models", Proceedings of the 21st International Conference on Machine Learning, 2004, 9 pages.
Cavalin et al., "Dynamic selection approaches for multiple classifier systems", Neural Comput. and Applic., 2013, pp. 673-688, vol. 22.
Cavalin et al., "LoGID: An adaptive framework combining local and global incremental learning for dynamic selection of ensembles of HMMs", Pattern Recognition, 2012, pp. 3544-3556, vol. 45.
Chandrashekar et al., "A survey on feature selection methods", Computers and Electrical Engineering, 2014, pp. 16-28, vol. 40.
Charoenphakdee et al., "Classification with Rejection Based on Cost-sensitive Classification", retrieved from Xiv:2010.11748v5, 2021, 40 pages.
Cruz et al., "META-DES.H: a dynamic ensemble selection technique using meta-learning and a dynamic weighting approach", in 2015 International Joint Conference on Neural Networks (IJCNN), 2015, 8 pages.
Cruz et al., "Dynamic classifier selection: recent advances and perspectives", Information Fusion, 2017, pp. 1-65.
Cruz et al., "DESlib: A dynamic ensemble selection library in python", Journal of Machine Learning Research, 2020, pp. 1-5, vol. 21.
Davtalab et al., "Dynamic Ensemble Selection Using Fuzzy Hyperboxes", retrieved from arXiv:2205.10438v1, 2022, 9 pages.
Friedman, "Greedy Function Approximation: A Gradient Boosting Machine", The Annals of Statistics, 2001, pp. 1189-1232, vol. 29, No. 5.
Garcia et al., "Dynamic ensemble selection for multi-class imbalanced datasets", Information Sciences, 2018, pp. 22-37, vol. 445-446.
Giacinto et al., "Dynamic Classifier Selection based on Multiple Classifier Behaviour", Pattern Recognition, 2001, pp. 1879-1882, vol. 34(9).
Gunes et al., "Combination, Cooperation and Selection of Classifiers: A State of the Art.", International Journal of Pattern Recognition and Artificial Intelligence, 2003, pp. 1-22, vol. 17, No. 8.
Hanczar et al., "Classification with reject option in gene expression data", Bioinformatics, 2008, pp. 1889-1895, vol. 24, No. 17.
Hansen et al., "Smart City Analytics: Ensemble-Learned Prediction of Citizen Home Care", retrieved from arXiv:1708.06403v1, 2017, 4 pages.
Herbei et al., "Classification With Reject Option", Jun. 21, 2005, pp. 1-28.
Homenda et al., "Classification with rejection based on various SVM techniques", 2014 International Joint Conference on Neural Networks (IJCNN), 2014, 10 pages.
Kilian et al., "Machine Learning with a Reject Option: A survey", retrieved from arXiv:2107.11277v3, 2021, pp. 1-43.
Ko et al., "From dynamic classifier selection to dynamic ensemble selection", Pattern Recognition, 2008, pp. 1718-1731, vol. 41.
Li et al., "Incremental learning imbalanced data streams with concept drift: The dynamic updated ensemble algorithm", Knowledge-Based Systems, 2020, pp. 1-17, vol. 195.
Mauri et al., "Robust ML model ensembles via risk-driven anti-clustering of training data", Information Sciences, 2023, pp. 122-140, vol. 633.
Nadeem et al., "Accuracy-Rejection Curves (ARCs) for Comparing Classification Methods with a Reject Option", Machine Learning in Systems Biology, 2010, pp. 65-81, vol. 8.
Nguyen et al., "Ensemble Selection based on Classifier Prediction Confidence", Pattern Recognition, 2020, pp. 1-15, vol. 100.
Parvin et al., "Proposing a classifier ensemble framework based on classifier selection and decision tree", Engineering Applications of Artificial Intelligence, 2015, pp. 34-42, vol. 37.
Pisani et al., "Adaptive Biometric Systems: Review and Perspectives", ACM Computing Surveys, 2019, 38 pages.
Sagi et al., "Ensemble learning: A survey", WIREs Data Mining Knowledge Discovery, 2018, pp. 1-18.
Soares et al., "Using Accuracy and Diversity to Select Classifiers to Build Ensembles", 2006 International Joint Conference on Neural Networks, Jul. 2006, pp. 1310-1316.
Sousa et al., "Classification with Reject Option Using the Self-Organizing Map", ICANN 2014, 2014, pp. 105-112.
Vanschoren et al., "OpenML: networked science in machine learning", retrieved from arXiv:1407.7722v2, 2014, 12 pages.
Wang et al., "Static and Dynamic Ensembles of Neural Networks for Solar Power Forecasting", 2018 International Joint Conference on Neural Networks (IJCNN), 2018, 8 pages.
Woloszynski et al., "A probabilistic model of classifier competence for dynamic ensemble selection", Pattern Recognition, 2011, pp. 2656-2668, vol. 44.
Woloszynski et al., "A measure of competence based on random classification for dynamic ensemble selection", Information Fusion, 2012, pp. 207-213, vol. 13.
Woods et al., "Combination of Multiple Classifiers Using Local Accuracy Estimates", IEEE Transactions on Pattern Analysis and Machine Intelligence, Apr. 1997, pp. 405-410, vol. 19, No. 4.
Zhang et al., "A Deep Bayesian Neural Network for Cardiac Arrhythmia Classification with Rejection from ECG Recordings", retrieved from arXiv:2203.00512v1, 2022, pp. 1-12.
Zhang et al., "A Survey on Learning to Reject (Abstract)", Proceedings of the IEEE, Feb. 2023, 2 pages.
Zheng et al., "SVM-based Credit Card Fraud Detection with Reject Cost and Class-dependent Error Cost", ICEC '09, 2009, pp. 50-58.

* cited by examiner

DESCRIPTION OF THE EXPERIMENT DATASETS

| DATASET | SOURCE | SAMPLES (FEATURES) | MIN. RATIO | CLASSES |
|---|---|---|---|---|
| PAYMENT RISK | OPENML | 28,000 (29) | 0.002 | NORMAL; FRAUD |
| WATER QUALITY | UCI | 139,566 (11) | 0.012 | GOOD; BAD |
| MAMMOGRAPHY | OPENML | 11,183 (6) | 0.023 | NEGATIVE; POSITIVE |
| NETWORK ATTACK | UCI | 93,124 (41) | 0.057 | NORMAL; ATTACK |
| HYPOTHYROID | OPENML | 3,772 (7) | 0.061 | NEGATIVE; POSITIVE |
| VOWEL | OPENML | 9,861 (12) | 0.087 | PLAYER 1; OTHERS |
| ACTIVITY MONITOR | UCI | 10,299 (11 PCA) | 0.185 | STANDING; OTHERS |
| CREDIT DEFAULT | UCI | 30,000 (23) | 0.221 | GOOD; DEFAULT |
| ADULT INCOME | OPENML | 32,561 (14) | 0.241 | LOW; HIGH |
| LAND COVER | OPENML | 581,012 (54) | 0.365 | SPRUCE; OTHERS |
| BREAST CANCER | OPENML | 569 (30) | 0.373 | NEGATIVE; POSITIVE |
| MNIST | OPENML | 42,000 (42 PCA) | 0.490 | ODD; EVEN |

FIG. 11

PERFORMANCE OF DIFFERENT MODELS ON THE CLASS-IMBALANCED DATASETS

| | MODEL | PAYMENT RISK | WATER QUALITY | MAMMOGRAPHY | NETWORK ATTACK | HYPOTHYROID | VOWEL |
|---|---|---|---|---|---|---|---|
| | PROPOSED: ACP | 0.36 (0.02) | 13.01 (0.01) | <0.01 (0.00) | 0.05 (0.01) | <0.01 (0.00) | 0.01 (0.00) |
| | PROPOSED: ALL | 0.37 (0.02) | 13.01 (0.01) | <0.01 (0.00) | 0.06 (0.01) | <0.01 (0.00) | 0.01 (0.00) |
| | DES KNN | 1.53 (0.10) | 0.78 (0.04) | 0.16 (0.01) | 0.80 (0.08) | 0.08 (0.01) | 0.25 (0.02) |
| INFERENCE | KNOP | 1.44 (0.07) | 0.76 (0.01) | 0.17 (0.01) | 0.74 (0.11) | 0.08 (0.01) | 0.20 (0.01) |
| TIME | DESP | 1.46 (0.11) | 0.76 (0.01) | 0.15 (0.01) | 0.68 (0.06) | 0.07 (0.01) | 0.19 (0.01) |
| [SEC] | DESMI | 1.44 (0.06) | 0.77 (0.01) | 0.15 (0.01) | 0.68 (0.05) | 0.06 (0.01) | 0.19 (0.01) |
| | KNORA-U | 1.45 (0.09) | 0.75 (0.01) | 0.14 (0.00) | 0.68 (0.06) | 0.06 (0.01) | 0.19 (0.01) |
| | KNORA-E | 1.45 (0.05) | 0.76 (0.01) | 0.15 (0.01) | 0.70 (0.10) | 0.07 (0.01) | 0.20 (0.02) |
| | META-DES | 1.51 (0.13) | 0.77 (0.01) | 0.16 (0.01) | 0.71 (0.04) | 0.08 (0.00) | 0.23 (0.02) |
| | RRC | 1.45 (0.06) | 0.76 (0.01) | 0.15 (0.01) | 0.69 (0.08) | 0.06 (0.02) | 0.19 (0.01) |
| | PROPOSED: ACP | 86.71 (0.48) | 97.14 (0.24) | 74.43 (1.66) | 99.07 (0.04) | 89.50 (1.04) | 95.93 (0.60) |
| | PROPOSED: ALL | 86.06 (0.49) | 97.13 (0.24) | 68.14 (1.53) | 97.19 (0.03) | 89.39 (1.05) | 94.65 (1.18) |
| | DES KNN | 82.65 (1.97) | 96.08 (0.37) | 66.24 (1.81) | 96.92 (0.26) | 82.61 (2.01) | 95.29 (0.96) |
| | KNOP | 84.85 (0.64) | 96.03 (0.93) | 67.85 (1.12) | 97.08 (0.14) | 82.47 (0.97) | 94.42 (0.62) |
| PR-AUC | DESP | 84.20 (1.33) | 96.26 (0.17) | 68.19 (1.43) | 97.08 (0.17) | 84.26 (1.55) | 95.26 (0.55) |
| [%] | DESMI | 84.17 (1.23) | 96.40 (0.20) | 67.69 (1.09) | 94.37 (0.84) | 81.86 (1.46) | 94.42 (0.62) |
| | KNORA-U | 84.36 (0.93) | 96.27 (0.28) | 68.07 (1.15) | 97.11 (0.13) | 83.60 (0.89) | 95.34 (0.51) |
| | KNORA-E | 83.15 (1.99) | 96.29 (0.26) | 67.85 (1.53) | 96.87 (0.33) | 82.98 (1.17) | 95.37 (0.54) |
| | META-DES | 85.11 (0.70) | 94.97 (1.30) | 67.72 (1.21) | 97.05 (0.12) | 77.05 (4.00) | 92.45 (1.66) |
| | RRC | 83.86 (1.50) | 96.21 (0.34) | 67.61 (1.40) | 97.07 (0.19) | 82.90 (1.75) | 95.44 (0.68) |
| | PROPOSED: ACP | 88.25 (0.36) | 96.55 (0.06) | 72.93 (1.57) | 96.98 (0.05) | 84.49 (1.31) | 89.67 (0.74) |
| | PROPOSED: ALL | 88.20 (0.36) | 96.38 (0.06) | 66.00 (1.17) | 91.59 (0.11) | 84.32 (1.27) | 88.00 (0.81) |
| | DES KNN | 83.65 (1.68) | 94.41 (1.19) | 64.63 (0.82) | 92.09 (0.41) | 82.39 (0.97) | 89.12 (1.60) |
| | KNOP | 85.54 (0.78) | 94.78 (0.45) | 65.91 (0.97) | 92.13 (0.36) | 82.31 (1.03) | 87.34 (1.51) |
| F1 SCORE | DESP | 86.09 (1.13) | 94.87 (0.45) | 66.77 (0.85) | 92.18 (0.37) | 82.83 (1.20) | 88.67 (1.20) |
| [%] | DESMI | 84.72 (0.75) | 95.54 (0.39) | 66.69 (1.08) | 90.16 (0.53) | 82.14 (1.06) | 87.84 (1.45) |
| | KNORA-U | 85.86 (1.24) | 95.71 (0.46) | 65.76 (1.02) | 92.10 (0.32) | 82.56 (0.93) | 89.34 (1.10) |
| | KNORA-E | 84.41 (0.81) | 94.71 (0.46) | 65.86 (1.53) | 92.32 (0.43) | 81.35 (0.81) | 89.25 (1.38) |
| | META-DES | 85.04 (0.50) | 95.36 (0.56) | 66.18 (0.99) | 91.92 (0.34) | 81.78 (1.20) | 87.72 (1.44) |
| | RRC | 84.34 (0.69) | 94.80 (0.50) | 65.84 (0.85) | 92.24 (0.39) | 82.85 (0.96) | 88.99 (1.41) |
| REJ. RATIO | PROPOSED: ACP | <0.01 | <0.01 | 0.03 | 0.04 | <0.01 | 0.02 |
| REJ. PR-AUC [%] | BEST BASE | 9.42 (13.2) | N/A | 28.85 (5.44) | 68.30 (1.28) | N/A | 31.34 (6.33) |

FIG. 12

PERFORMANCE OF DIFFERENT MODELS ON THE CLASS-IMBALANCED DATASETS

|  | MODEL | ACTIVITY MONITOR | CREDIT DEFAULT | ADULT INCOME | LAND COVER | BREAST CANCER | MNIST |
|---|---|---|---|---|---|---|---|
| INFERENCE TIME [SEC] | PROPOSED: ACP | <0.01 (0.00) | 0.06 (0.01) | 0.03 (0.00) | 1.28 (0.05) | <0.01 (0.00) | 0.02 (0.00) |
|  | PROPOSED: ALL | <0.01 (0.00) | 0.06 (0.01) | 0.03 (0.05) | 1.29 (0.05) | <0.01 (0.00) | 0.02 (0.00) |
|  | DES KNN | 0.25 (0.03) | 0.46 (0.05) | 0.60 (0.03) | 72.06 (3.23) | 0.05 (0.01) | 1.93 (0.19) |
|  | KNOP | 0.15 (0.01) | 0.33 (0.02) | 0.38 (0.03) | 60.55 (3.80) | 0.05 (0.00) | 1.46 (0.11) |
|  | DESP | 0.14 (0.01) | 0.32 (0.03) | 0.40 (0.04) | 61.50 (3.48) | 0.04 (0.01) | 1.45 (0.16) |
|  | DESMI | 0.13 (0.01) | 0.32 (0.03) | 0.35 (0.03) | 61.50 (3.48) | 0.04 (0.00) | 1.44 (0.12) |
|  | KNORA-U | 0.14 (0.01) | 0.32 (0.02) | 0.36 (0.03) | 57.63 (3.38) | 0.04 (0.00) | 1.42 (0.08) |
|  | KNORA-E | 0.14 (0.02) | 0.31 (0.02) | 0.35 (0.03) | 62.98 (2.70) | 0.04 (0.01) | 0.41 (0.08) |
|  | META-DES | 0.16 (0.02) | 0.35 (0.02) | 0.40 (0.03) | 62.33 (3.06) | 0.05 (0.01) | 1.53 (0.13) |
|  | RRC | 0.17 (0.01) | 0.30 (0.02) | 0.36 (0.02) | 63.88 (3.37) | 0.04 (0.00) | 1.48 (0.14) |
| AUC [%] | PROPOSED: ACP | 98.08 (0.04) | 78.03 (0.04) | 92.44 (0.04) | 94.07 (0.01) | 98.45 (0.21) | 99.00 (0.07) |
|  | PROPOSED: ALL | 97.73 (0.05) | 78.02 (0.04) | 92.02. (0.04) | 92.52 (0.01) | 98.45 (0.21) | 98.96 (0.08) |
|  | DES KNN | 97.79 (0.08) | 77.25 (0.06) | 91.42 (0.05) | 92.51 (0.33) | 97.94 (0.36) | 98.34 (0.21) |
|  | KNOP | 97.80 (0.07) | 77.24 (0.05) | 91.52 (0.04) | 91.50 (0.31) | 97.48 (0.68) | 98.12 (0.28) |
|  | DESP | 97.82 (0.05) | 77.28 (0.05) | 91.42 (0.05) | 92.38 (0.34) | 96.86 (0.73) | 98.31 (0.26) |
|  | DESMI | 97.75 (0.20) | 77.18 (0.10) | 91.01 (0.07) | 90.56 (0.45) | 96.86 (0.73) | 96.29 (0.83) |
|  | KNORA-U | 97.84 (0.04) | 77.22 (0.05) | 91.44 (0.04) | 92.34 (0.33) | 96.42 (1.14) | 98.28 (0.26) |
|  | KNORA-E | 97.73 (0.10) | 77.26 (0.05) | 91.44 (0.05) | 92.61 (0.34) | 96.42 (1.14) | 98.35 (0.25) |
|  | META-DES | 97.78 (0.04) | 77.27 (0.05) | 91.40 (0.05) | 92.32 (0.34) | 98.08 (0.46) | 97.97 (0.20) |
|  | RRC | 97.66 (0.07) | 77.26 (0.05) | 91.42 (0.04) | 92.29 (0.33) | 96.68 (0.37) | 98.25 (0.26) |
| ACCURACY [%] | PROPOSED: ACP | 93.98 (0.08) | 81.78 (0.04) | 87.45 (0.06) | 88.22 (0.01) | 93.88 (0.72) | 95.45 (0.26) |
|  | PROPOSED: ALL | 93.29 (0.13) | 81.78 (0.04) | 86.89 (0.06) | 85.17 (0.01) | 93.88 (0.72) | 95.22 (0.27) |
|  | DES KNN | 93.38 (0.22) | 81.77 (0.11) | 86.06 (0.07) | 87.81 (0.35) | 93.67 (0.47) | 94.34 (0.42) |
|  | KNOP | 93.40 (0.12) | 81.77 (0.08) | 86.18 (0.10) | 84.62 (0.32) | 93.35 (0.38) | 93.49 (0.69) |
|  | DESP | 93.55 (0.14) | 81.89 (0.11) | 86.05 (0.07) | 87.67 (0.34) | 94.20 (0.39) | 94.16 (0.57) |
|  | DESMI | 93.56 (0.15) | 81.73 (0.14) | 85.32 (0.018) | 83.50 (0.45) | 92.23 (0.51) | 91.80 (1.30) |
|  | KNORA-U | 93.56 (0.15) | 81.76 (0.06) | 86.07 (0.07) | 87.81 (0.34) | 93.56 (0.39) | 94.12 (0.58) |
|  | KNORA-E | 93.32 (0.20) | 81.83 (0.08) | 86.12 (0.08) | 88.20 (0.35) | 94.36 (0.62) | 94.20 (0.55) |
|  | META-DES | 93.41 (0.18) | 81.81 (0.11) | 85.98 (0.07) | 87.73 (0.35) | 93.88 (0.28) | 93.20 (0.67) |
|  | RRC | 93.13 (0.20) | 81.81 (0.09) | 86.01 (0.06) | 87.43 (0.34) | 93.56 (0.17) | 93.88 (0.57) |
| REJ. RATIO | PROPOSED: ACP | 0.02 | 0.00 | 0.02 | <0.01 | 0.00 | <0.01 |
| REJ. PR-AUC [%] | BEST BASE | 66.09 (2.34) | N/A | 55.90 (2.46) | 63.34 (6.51) | N/A | 61.79 (0.01) |

FIG. 13

PERFORMANCE WITH DIFFERENT NUMBER OF BASE MODELS (PAYMENT RISK DATA)

| # BASE | REJ. RATIO | TIME [SEC] | PR-AUC [%] | F1 SCORE [%] |
|---|---|---|---|---|
| 1 | 0.105 | 0.31 (0.06) | 90.63 (0.65) | 92.97 (0.48) |
| 2 | 0.053 | 0.32 (0.03) | 88.77 (0.50) | 91.88 (0.21) |
| 3 | 0.013 | 0.35 (0.03) | 87.51 (0.30) | 90.24 (0.26) |
| 4 | 0.409 | 0.36 (0.03) | 87.16 (0.18) | 90.05 (0.36) |
| 5 | 0.009 | 0.36 (0.02) | 87.00 (0.23) | 89.64 (0.52) |
| 6 | 0.601 | 0.36 (0.02) | 86.71 (0.48) | 88.25 (0.36) |
| BEST DES | N/A | 1.44 (0.06) | 85.11 (0.70) | 86.09 (1.13) |

FIG. 14

METHOD, SYSTEM, AND COMPUTER PROGRAM PRODUCT FOR ENSEMBLE LEARNING WITH REJECTION

CROSS REFERENCE TO RELATED APPLICATIONS

This application is the United States national phase of International Application No. PCT/US24/29345 filed May 15, 2024, and claims the benefit of U.S. Patent Provisional Application Ser. No. 63/503,294, filed May 19, 2023, the disclosures of which are hereby incorporated by reference in their entireties.

BACKGROUND

1. Technical Field

This disclosure relates generally to ensemble learning and, in non-limiting embodiments or aspects, to methods, systems, and computer program products for ensemble learning with rejection to improve the performance and credibility of classification tasks.

2. Technical Considerations

Recent studies have found that selective ensemble learning (e.g., dynamic ensemble selection, etc.) shows better predictive performance for classification tasks as compared to traditional static ensemble learning. However, there are some limitations of available methods which affect practical implementation, such as high computational cost and/or restrictions in baseline machine learning model ranking and aggregation, especially for class-imbalanced data. Also, existing methods may make predictions for all data without measuring model credibility regarding different feature patterns.

SUMMARY

Accordingly, provided are improved methods, systems, and computer program products for ensemble learning.

According to non-limiting embodiments or aspects, provided is a method, including: (i) for each baseline machine learning model of a set of baseline machine learning models, with at least one processor: training that baseline machine learning model based on a plurality of first training samples, wherein the plurality of first training samples includes a plurality of different data types, and wherein training that baseline machine learning model generates a plurality of first predictions for the plurality of first training samples; generating, for that baseline machine learning model, based on the plurality of first predictions for the plurality of first training samples, a rejection region associated with at least one data type of the plurality of different data types; and processing, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model, wherein a baseline model predictive performance metric for that baseline machine learning model is determined based on the subset of second predictions of that baseline machine learning model, and wherein the plurality of second training samples is associated with a plurality of rejection flags for that baseline machine learning model, wherein each rejection flag of the plurality of rejection flags indicates whether a corresponding second sample of the plurality of second samples is within the rejection region of that baseline machine learning model; (ii) generating, with the at least one processor, a global rejection region associated with one or more data types of the plurality of different data types based on the rejection region associated with each baseline machine learning model; (iii) training, with the at least one processor, an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model, wherein training the ensemble machine learning model generates a subset of ensemble predictions for the further subset of second training samples of the plurality of second training samples outside the global rejection region, and wherein an ensemble model predictive performance metric is determined based on the subset of ensemble predictions; (iv) updating, with the at least one processor, based on the baseline model predictive performance metric for each baseline machine learning model, the set of baseline machine learning models; and (v) repeating, with the at least one processor, (i)-(iv) until there is a single baseline machine learning model in the set of baseline machine learning models or at least one of the ensemble model predictive performance metric satisfies a threshold ensemble model predictive performance, a ratio of the plurality of second training samples outside the global rejection region satisfies a threshold ratio, or any combination thereof.

In some non-limiting embodiments or aspects, for each baseline machine learning model of the set of baseline machine learning models, generating, for that baseline machine learning model, based on the plurality of first predictions for the plurality of first training samples, the rejection region associated with the at least one data type of the plurality of different data types includes optimizing an objective function defined according to the following equation:

$$\mathrm{argmax}_{(t_{lb})} T_{acc}(t_{lb})$$
$$\text{with } 0 < t_{lb} < 1; \frac{N_{rej}}{N} \le a\%;$$

and any other constraints of interest;
where $t_{lb}$ is a lower bound of the rejection region; $T_{acc}$ is a model performance evaluation metric of that baseline machine learning model calculated using first samples of the plurality of samples outside the rejection region; $N_{rej}$ is a number of the plurality of first samples rejected with scores within the rejection region; $N$ is a number of the plurality of first samples in total; and a % is a user-defined rejection ratio limit for that baseline machine learning model.

In some non-limiting embodiments or aspects, an optimal solution of $t_{lb}$ is obtained using at last one of the following searching or optimization algorithms: a Grid search, a Bayesian optimization, a Simulated annealing, a Genetic algorithm, a Particle swarm optimization, or any combination thereof.

In some non-limiting embodiments or aspects, for each baseline machine learning model of the set of baseline machine learning models, the plurality of second training samples is associated with a plurality of distance measures, wherein each distance measure of the plurality of distance measures indicates a distance of a corresponding second sample from at least one boundary of the rejection region of that baseline machine learning model, and wherein training, with the at least one processor, the ensemble machine learning model is further based on (d) the plurality of distance measures for the plurality of second samples associated with each baseline machine learning model.

In some non-limiting embodiments or aspects, each baseline machine learning model of the set of baseline machine learning models includes a multi-class classification model for predicting one of a number of classes q, where q is more than two classes, and wherein the rejection region of each baseline machine learning model includes a number q−1 bounds defining the rejection region.

In some non-limiting embodiments or aspects, a meta-model is used to ensemble the set of baseline machine learning models into the ensemble machine learning model.

In some non-limiting embodiments or aspects, the method further includes: (vi) obtaining, with the at least one processor, a current sample; (vii) determining, with the at least one processor, whether the current sample is within the global rejection region; (viii) in response to determining that the current sample is outside the global rejection region, automatically processing, with the at least one processor, using the ensemble machine learning model, the current sample to generate a current prediction for the current sample; and (ix) in response to determining that the current sample is within the global rejection region, automatically flagging, with the at least one processor, the current sample as unable to receive a credible prediction from the ensemble classifier.

According to some non-limiting embodiments or aspects, provided is a system, including: at least one processor configured to: (i) for each baseline machine learning model of a set of baseline machine learning models: train that baseline machine learning model based on a plurality of first training samples, wherein the plurality of first training samples includes a plurality of different data types, and wherein training that baseline machine learning model generates a plurality of first predictions for the plurality of first training samples; generate, for that baseline machine learning model, based on the plurality of first predictions for the plurality of first training samples, a rejection region associated with at least one data type of the plurality of different data types; and process, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model, wherein a baseline model predictive performance metric for that baseline machine learning model is determined based on the subset of second predictions of that baseline machine learning model, and wherein the plurality of second training samples is associated with a plurality of rejection flags for that baseline machine learning model, wherein each rejection flag of the plurality of rejection flags indicates whether a corresponding second sample of the plurality of second samples is within the rejection region of that baseline machine learning model; (ii) generate a global rejection region associated with one or more data types of the plurality of different data types based on the rejection region associated with each baseline machine learning model; (iii) train an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model, wherein training the ensemble machine learning model generates a subset of ensemble predictions for the further subset of second training samples of the plurality of second training samples outside the global rejection region, and wherein an ensemble model predictive performance metric is determined based on the subset of ensemble predictions; (iv) update, based on the baseline model predictive performance metric for each baseline machine learning model, the set of baseline machine learning models; and (v) repeat (i)-(iv) until there is a single baseline machine learning model in the set of baseline machine learning models or at least one of the ensemble model predictive performance metric satisfies a threshold ensemble model predictive performance, a ratio of the plurality of second training samples outside the global rejection region satisfies a threshold ratio, or any combination thereof.

In some non-limiting embodiments or aspects, the at least one processor is configured to, for each baseline machine learning model of the set of baseline machine learning models, generate, for that baseline machine learning model, based on the plurality of first predictions for the plurality of first training samples, the rejection region associated with the at least one data type of the plurality of different data types by optimizing an objective function defined according to the following equation:

$$\mathrm{argmax}_{(t_{lb})} T_{acc}(t_{lb})$$

$$\text{with } 0 < t_{lb} < 1; \frac{N_{rej}}{N} \leq a\%;$$

and any other constraints of interest;
where $t_{lb}$ is a lower bound of the rejection region; $T_{acc}$ is a model performance evaluation metric of that baseline machine learning model calculated using first samples of the plurality of samples outside the rejection region; $N_{rej}$ is a number of the plurality of first samples rejected with scores within the rejection region; N is a number of the plurality of first samples in total; and a % is a user-defined rejection ratio limit for that baseline machine learning model.

In some non-limiting embodiments or aspects, an optimal solution of $t_{lb}$ is obtained using at last one of the following searching or optimization algorithms: a Grid search, a Bayesian optimization, a Simulated annealing, a Genetic algorithm, a Particle swarm optimization, or any combination thereof.

In some non-limiting embodiments or aspects, for each baseline machine learning model of the set of baseline machine learning models, the plurality of second training samples is associated with a plurality of distance measures, wherein each distance measure of the plurality of distance measures indicates a distance of a corresponding second sample from at least one boundary of the rejection region of that baseline machine learning model, and wherein the at least one processor is further configured to train the ensemble machine learning model based on (d) the plurality of distance measures for the plurality of second samples associated with each baseline machine learning model.

In some non-limiting embodiments or aspects, each baseline machine learning model of the set of baseline machine learning models includes a multi-class classification model for predicting one of a number of classes q, where q is more than two classes, and wherein the rejection region of each baseline machine learning model includes a number q−1 bounds defining the rejection region.

In some non-limiting embodiments or aspects, a meta-model is used to ensemble the set of baseline machine learning models into the ensemble machine learning model.

In some non-limiting embodiments or aspects, the at least one processor is further configured to: (vi) obtain a current sample; (vii) determine whether the current sample is within the global rejection region; (viii) in response to determining that the current sample is outside the global rejection region, automatically process, using the ensemble machine learning model, the current sample to generate a current prediction for the current sample; and (ix) in response to determining that the current sample is within the global rejection region, automatically flag, the current sample as unable to receive a credible prediction from the ensemble classifier.

According to some non-limiting embodiments or aspects, provided is a computer program product including at least one non-transitory computer-readable medium including program instructions that, when executed by at least one processor, cause the at least one processor to: (i) for each baseline machine learning model of a set of baseline machine learning models: train that baseline machine learning model based on a plurality of first training samples, wherein the plurality of first training samples includes a plurality of different data types, and wherein training that baseline machine learning model generates a plurality of first predictions for the plurality of first training samples; generate, for that baseline machine learning model, based on the plurality of first predictions for the plurality of first training samples, a rejection region associated with at least one data type of the plurality of different data types; and process, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model, wherein a baseline model predictive performance metric for that baseline machine learning model is determined based on the subset of second predictions of that baseline machine learning model, and wherein the plurality of second training samples is associated with a plurality of rejection flags for that baseline machine learning model, wherein each rejection flag of the plurality of rejection flags indicates whether a corresponding second sample of the plurality of second samples is within the rejection region of that baseline machine learning model; (ii) generate a global rejection region associated with one or more data types of the plurality of different data types based on the rejection region associated with each baseline machine learning model; (iii) train an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model, wherein training the ensemble machine learning model generates a subset of ensemble predictions for the further subset of second training samples of the plurality of second training samples outside the global rejection region, and wherein an ensemble model predictive performance metric is determined based on the subset of ensemble predictions; (iv) update, based on the baseline model predictive performance metric for each baseline machine learning model, the set of baseline machine learning models; and (v) repeat (i)-(iv) until there is a single baseline machine learning model in the set of baseline machine learning models or at least one of the ensemble model predictive performance metric satisfies a threshold ensemble model predictive performance, a ratio of the plurality of second training samples outside the global rejection region satisfies a threshold ratio, or any combination thereof.

In some non-limiting embodiments or aspects, the program instructions, when executed by the at least one processor, cause the at least one processor to, for each baseline machine learning model of the set of baseline machine learning models, generate, for that baseline machine learning model, based on the plurality of first predictions for the plurality of first training samples, the rejection region associated with the at least one data type of the plurality of different data types by optimizing an objective function defined according to the following equation:

$$\mathrm{argmax}_{(t_{lb})} T_{acc}(t_{lb})$$

$$\text{with } 0 < t_{lb} < 1; \frac{N_{rej}}{N} \le a\%;$$

and any other constraints of interest;

where $t_{lb}$ is a lower bound of the rejection region; $T_{acc}$ is a model performance evaluation metric of that baseline machine learning model calculated using first samples of the plurality of samples outside the rejection region; $N_{rej}$ is a number of the plurality of first samples rejected with scores within the rejection region; N is a number of the plurality of first samples in total; and a % is a user-defined rejection ratio limit for that baseline machine learning model.

In some non-limiting embodiments or aspects, an optimal solution of $t_{lb}$ is obtained using at last one of the following searching or optimization algorithms: a Grid search, a Bayesian optimization, a Simulated annealing, a Genetic algorithm, a Particle swarm optimization, or any combination thereof.

In some non-limiting embodiments or aspects, for each baseline machine learning model of the set of baseline machine learning models, the plurality of second training samples is associated with a plurality of distance measures, wherein each distance measure of the plurality of distance measures indicates a distance of a corresponding second sample from at least one boundary of the rejection region of that baseline machine learning model, and wherein the program instructions, when executed by the at least one processor, further cause the at least one processor to train the ensemble machine learning model based on (d) the plurality of distance measures for the plurality of second samples associated with each baseline machine learning model.

In some non-limiting embodiments or aspects, a meta-model is used to ensemble the set of baseline machine learning models into the ensemble machine learning model.

In some non-limiting embodiments or aspects, the program instructions, when executed by the at least one processor, further cause the at least one processor to: (vi) obtain a current sample; (vii) determine whether the current sample is within the global rejection region; (viii) in response to determining that the current sample is outside the global rejection region, automatically process, using the ensemble machine learning model, the current sample to generate a current prediction for the current sample; and (ix) in response to determining that the current sample is within the global rejection region, automatically flag, the current sample as unable to receive a credible prediction from the ensemble classifier.

Further non-limiting embodiments or aspects are set forth in the following numbered clauses:

Clause 1. A method, comprising: (i) for each baseline machine learning model of a set of baseline machine learning models, with at least one processor: training that baseline machine learning model based on a plurality of first training samples, wherein the plurality of first training samples includes a plurality of different data types, and wherein training that baseline machine learning model generates a plurality of first predictions for the plurality of first training samples; generating, for that baseline machine learning model, based on the plurality of first predictions for the plurality of first training samples, a rejection region associated with at least one data type of the plurality of different data types; and processing, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model, wherein a baseline model predictive performance metric for that baseline machine learning model is determined based on the subset of second predictions of that baseline machine learning model, and wherein the plurality of second training samples is associated with a plurality of rejection flags for that baseline machine learning model, wherein each rejection flag of the plurality of rejection flags indicates whether a corresponding second sample of the plurality of second samples is within the rejection region of that baseline machine learning model; (ii) generating, with the at least one processor, a global rejection region associated with one or more data types of the plurality of different data types based on the rejection region associated with each baseline machine learning model; (iii) training, with the at least one processor, an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model, wherein training the ensemble machine learning model generates a subset of ensemble predictions for the further subset of second training samples of the plurality of second training samples outside the global rejection region, and wherein an ensemble model predictive performance metric is determined based on the subset of ensemble predictions; (iv) updating, with the at least one processor, based on the baseline model predictive performance metric for each baseline machine learning model, the set of baseline machine learning models; and (v) repeating, with the at least one processor, (i)-(iv) until there is a single baseline machine learning model in the set of baseline machine learning models or at least one of the ensemble model predictive performance metric satisfies a threshold ensemble model predictive performance, a ratio of the plurality of second training samples outside the global rejection region satisfies a threshold ratio, or any combination thereof.

Clause 2. The method of clause 1, wherein, for each baseline machine learning model of the set of baseline machine learning models, generating, for that baseline machine learning model, based on the plurality of first predictions for the plurality of first training samples, the rejection region associated with the at least one data type of the plurality of different data types includes optimizing an objective function defined according to the following equation:

$$\mathrm{argmax}_{(t_{lb})} T_{acc}(t_{lb})$$

$$\text{with } 0 < t_{lb} < 1; \frac{N_{rej}}{N} \le a\%;$$

and any other constraints of interest;

where $t_{lb}$ is a lower bound of the rejection region; $T_{acc}$ is a model performance evaluation metric of that baseline machine learning model calculated using first samples of the plurality of samples outside the rejection region; $N_{rej}$ is a number of the plurality of first samples rejected with scores within the rejection region; N is a number of the plurality of first samples in total; and a % is a user-defined rejection ratio limit for that baseline machine learning model.

Clause 3. The method of clause 1 or 2, wherein an optimal solution of $t_{lb}$ is obtained using at last one of the following searching or optimization algorithms: a Grid search, a Bayesian optimization, a Simulated annealing, a Genetic algorithm, a Particle swarm optimization, or any combination thereof.

Clause 4. The method of any of clauses 1-3, wherein, for each baseline machine learning model of the set of baseline machine learning models, the plurality of second training samples is associated with a plurality of distance measures, wherein each distance measure of the plurality of distance measures indicates a distance of a corresponding second sample from at least one boundary of the rejection region of that baseline machine learning model, and wherein training, with the at least one processor, the ensemble machine learning model is further based on (d) the plurality of distance measures for the plurality of second samples associated with each baseline machine learning model.

Clause 5. The method of any of clauses 1-4, wherein each baseline machine learning model of the set of baseline machine learning models includes a multi-class classification model for predicting one of a number of classes q, where q is more than two classes, and wherein the rejection region of each baseline machine learning model includes a number q−1 bounds defining the rejection region.

Clause 6. The method of any of clauses 1-5, wherein a meta-model is used to ensemble the set of baseline machine learning models into the ensemble machine learning model.

Clause 7. The method of any of clauses 1-7, further comprising: (vi) obtaining, with the at least one processor, a current sample; (vii) determining, with the at least one processor, whether the current sample is within the global rejection region; (viii) in response to determining that the current sample is outside the global rejection region, automatically processing, with the at least one processor, using the ensemble machine learning model, the current sample to generate a current prediction for the current sample; and (ix)

in response to determining that the current sample is within the global rejection region, automatically flagging, with the at least one processor, the current sample as unable to receive a credible prediction from the ensemble classifier.

Clause 8. A system, comprising: at least one processor configured to: (i) for each baseline machine learning model of a set of baseline machine learning models: train that baseline machine learning model based on a plurality of first training samples, wherein the plurality of first training samples includes a plurality of different data types, and wherein training that baseline machine learning model generates a plurality of first predictions for the plurality of first training samples; generate, for that baseline machine learning model, based on the plurality of first predictions for the plurality of first training samples, a rejection region associated with at least one data type of the plurality of different data types; and process, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model, wherein a baseline model predictive performance metric for that baseline machine learning model is determined based on the subset of second predictions of that baseline machine learning model, and wherein the plurality of second training samples is associated with a plurality of rejection flags for that baseline machine learning model, wherein each rejection flag of the plurality of rejection flags indicates whether a corresponding second sample of the plurality of second samples is within the rejection region of that baseline machine learning model; (ii) generate a global rejection region associated with one or more data types of the plurality of different data types based on the rejection region associated with each baseline machine learning model; (iii) train an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model, wherein training the ensemble machine learning model generates a subset of ensemble predictions for the further subset of second training samples of the plurality of second training samples outside the global rejection region, and wherein an ensemble model predictive performance metric is determined based on the subset of ensemble predictions; (iv) update, based on the baseline model predictive performance metric for each baseline machine learning model, the set of baseline machine learning models; and (v) repeat (i)-(iv) until there is a single baseline machine learning model in the set of baseline machine learning models or at least one of the ensemble model predictive performance metric satisfies a threshold ensemble model predictive performance, a ratio of the plurality of second training samples outside the global rejection region satisfies a threshold ratio, or any combination thereof.

Clause 9. The system of clause 8, wherein the at least one processor is configured to, for each baseline machine learning model of the set of baseline machine learning models, generate, for that baseline machine learning model, based on the plurality of first predictions for the plurality of first training samples, the rejection region associated with the at least one data type of the plurality of different data types by optimizing an objective function defined according to the following equation:

$$\mathrm{argmax}_{(t_{lb})} T_{acc}(t_{lb})$$

$$\text{with } 0 < t_{lb} < 1; \; \frac{N_{rej}}{N} \le a\%;$$

and any other constraints of interest;
where $t_{lb}$ is a lower bound of the rejection region; $T_{acc}$ is a model performance evaluation metric of that baseline machine learning model calculated using first samples of the plurality of samples outside the rejection region; $N_{rej}$ is a number of the plurality of first samples rejected with scores within the rejection region; N is a number of the plurality of first samples in total; and a % is a user-defined rejection ratio limit for that baseline machine learning model.

Clause 10. The system of clause 8 or 9, wherein an optimal solution of $t_{lb}$ is obtained using at last one of the following searching or optimization algorithms: a Grid search, a Bayesian optimization, a Simulated annealing, a Genetic algorithm, a Particle swarm optimization, or any combination thereof.

Clause 11. The system of any of clauses 8-10, wherein, for each baseline machine learning model of the set of baseline machine learning models, the plurality of second training samples is associated with a plurality of distance measures, wherein each distance measure of the plurality of distance measures indicates a distance of a corresponding second sample from at least one boundary of the rejection region of that baseline machine learning model, and wherein the at least one processor is further configured to train the ensemble machine learning model based on (d) the plurality of distance measures for the plurality of second samples associated with each baseline machine learning model.

Clause 12. The system of any of clauses 8-11, wherein each baseline machine learning model of the set of baseline machine learning models includes a multi-class classification model for predicting one of a number of classes q, where q is more than two classes, and wherein the rejection region of each baseline machine learning model includes a number q−1 bounds defining the rejection region.

Clause 13. The system of any of clauses 8-12, wherein a meta-model is used to ensemble the set of baseline machine learning models into the ensemble machine learning model.

Clause 14. The system of any of clauses 8-13, wherein the at least one processor is further configured to: (vi) obtain a current sample; (vii) determine whether the current sample is within the global rejection region; (viii) in response to determining that the current sample is outside the global rejection region, automatically process, using the ensemble machine learning model, the current sample to generate a current prediction for the current sample; and (ix) in response to determining that the current sample is within the global rejection region, automatically flag, the current sample as unable to receive a credible prediction from the ensemble classifier.

Clause 15. A computer program product comprising at least one non-transitory computer-readable medium including program instructions that, when executed by at least one processor, cause the at least one processor to: (i) for each baseline machine learning model of a set of baseline machine learning models: train that baseline machine learning model based on a plurality of first training samples, wherein the plurality of first training samples includes a plurality of different data types, and wherein training that baseline machine learning model generates a plurality of first predictions for the plurality of first training samples; generate, for that baseline machine learning model, based on the plurality of first predictions for the plurality of first training samples, a rejection region associated with at least one data type of the plurality of different data types; and process, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model, wherein a baseline model predictive performance metric for that baseline machine learning model is determined based on the subset of second predictions of that baseline machine learning model, and wherein the plurality of second training samples is associated with a plurality of rejection flags for that baseline machine learning model, wherein each rejection flag of the plurality of rejection flags indicates whether a corresponding second sample of the plurality of second samples is within the rejection region of that baseline machine learning model; (ii) generate a global rejection region associated with one or more data types of the plurality of different data types based on the rejection region associated with each baseline machine learning model; (iii) train an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model, wherein training the ensemble machine learning model generates a subset of ensemble predictions for the further subset of second training samples of the plurality of second training samples outside the global rejection region, and wherein an ensemble model predictive performance metric is determined based on the subset of ensemble predictions; (iv) update, based on the baseline model predictive performance metric for each baseline machine learning model, the set of baseline machine learning models; and (v) repeat (i)-(iv) until there is a single baseline machine learning model in the set of baseline machine learning models or at least one of the ensemble model predictive performance metric satisfies a threshold ensemble model predictive performance, a ratio of the plurality of second training samples outside the global rejection region satisfies a threshold ratio, or any combination thereof.

Clause 16. The computer program product of clause 15, wherein the program instructions, when executed by the at least one processor, cause the at least one processor to, for each baseline machine learning model of the set of baseline machine learning models, generate, for that baseline machine learning model, based on the plurality of first predictions for the plurality of first training samples, the rejection region associated with the at least one data type of the plurality of different data types by optimizing an objective function defined according to the following equation:

$$\mathrm{argmax}_{\{t_{lb}\}} T_{acc}(t_{lb})$$

-continued $$\text{with } 0 < t_{lb} < 1; \frac{N_{rej}}{N} \le a\%;$$

and any other constraints of interest;
where $t_{lb}$ is a lower bound of the rejection region; $T_{acc}$ is a model performance evaluation metric of that baseline machine learning model calculated using first samples of the plurality of samples outside the rejection region; $N_{rej}$ is a number of the plurality of first samples rejected with scores within the rejection region; N is a number of the plurality of first samples in total; and a % is a user-defined rejection ratio limit for that baseline machine learning model.

Clause 17. The computer program product of clause 15 or 16, wherein an optimal solution of $t_{lb}$ is obtained using at last one of the following searching or optimization algorithms: a Grid search, a Bayesian optimization, a Simulated annealing, a Genetic algorithm, a Particle swarm optimization, or any combination thereof.

Clause 18. The computer program product of any of clauses 15-17, wherein, for each baseline machine learning model of the set of baseline machine learning models, the plurality of second training samples is associated with a plurality of distance measures, wherein each distance measure of the plurality of distance measures indicates a distance of a corresponding second sample from at least one boundary of the rejection region of that baseline machine learning model, and wherein the program instructions, when executed by the at least one processor, further cause the at least one processor to train the ensemble machine learning model based on (d) the plurality of distance measures for the plurality of second samples associated with each baseline machine learning model.

Clause 19. The computer program product of any of clauses 15-18, wherein a meta-model is used to ensemble the set of baseline machine learning models into the ensemble machine learning model.

Clause 20. The computer program product of any of clauses 15-19, wherein the program instructions, when executed by the at least one processor, further cause the at least one processor to: (vi) obtain a current sample; (vii) determine whether the current sample is within the global rejection region; (viii) in response to determining that the current sample is outside the global rejection region, automatically process, using the ensemble machine learning model, the current sample to generate a current prediction for the current sample; and (ix) in response to determining that the current sample is within the global rejection region, automatically flag, the current sample as unable to receive a credible prediction from the ensemble classifier.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 11 is a table including a description of experiment datasets;

FIG. 12 is a table including a performance of different models on class-imbalanced datasets;

FIG. 13 is a table including a performance of different models on class-balanced data;

FIG. 14 is a table including a performance of different numbers of baseline machine learning models.

DETAILED DESCRIPTION

Figure 1:
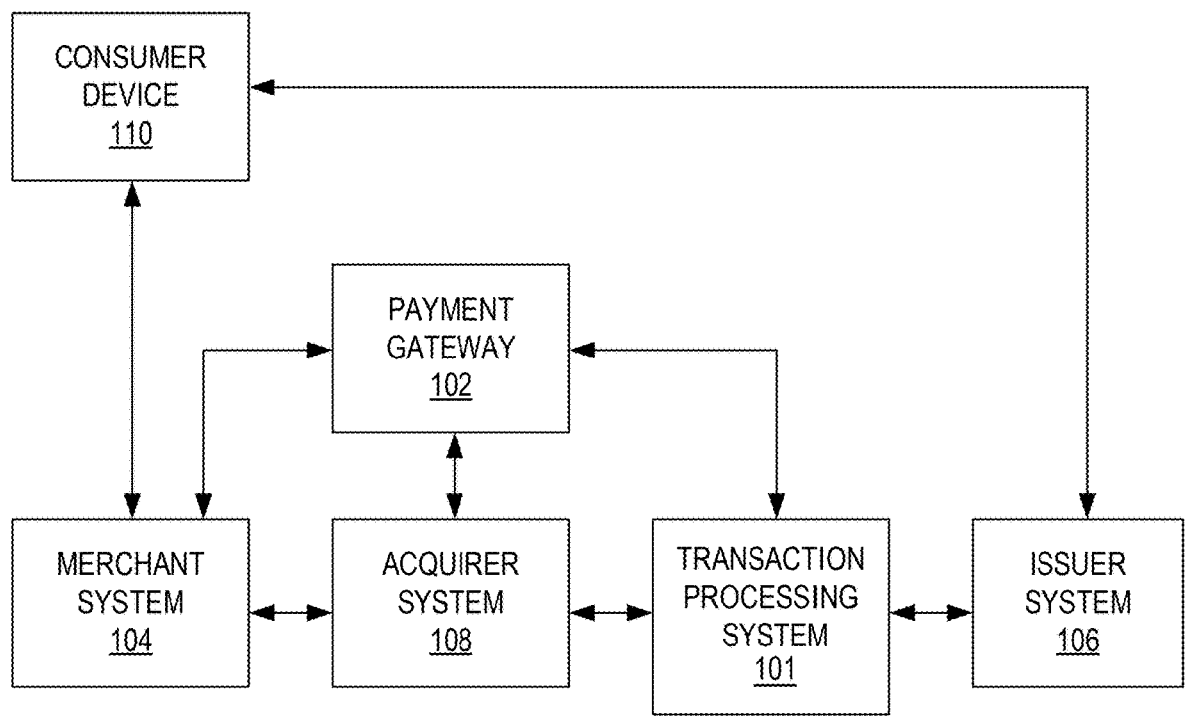
FIG. 1 is a schematic diagram of an electronic payment processing network, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "real-time" refers to performance of a task or tasks during another process or before another process is completed. For example, a real-time inference may be an inference that is obtained from a model before a payment transaction is authorized, completed, and/or the like.

Ensemble learning integrates the advantages of multiple baseline machine learning models and is widely used in classification tasks. Traditional approaches consider all the baseline machine learning models in the ensemble and use the same structure for the classification of every sample, which is referred as static ensemble. However, the appropriate base classifiers for different samples are usually different, due to the varying data patterns. Past studies have shown that a selective ensemble process usually provides better predictive performance compared to static ensemble. One of the most popular families for selective ensemble learning is called dynamic selection (DS). Instead of using all baseline machine learning models, DS takes one or a few models based on some competence measures, and performs ensemble using the selected classifier(s) only.

A number of DS approaches have been developed in the literature. Early studies aimed to find the best single classifier from the candidate pools for each new sample, which are referred as dynamic classifier selection (DCS). There are mainly two limitations of DCS: 1) there can be more than one model performing well for a given sample, so it is not necessary to select only one base classifier, and 2) selecting a single model may cause a high local sensitivity, especially when data are imbalanced or have a skewed feature distribution. Later studies addressed the issues by choosing multiple models with good performance for ensemble. This type of approach is referred as dynamic ensemble selection (DES). The different DES methods use distinct algorithms to measure the competence level of each base classifier for a given sample. The competence level typically depends on the accuracy of each model's prediction on the neighbors of the target sample. Once a number of base classifiers are selected according to the measured competence levels, a final prediction is made by aggregating the outputs from these models.

The DES approaches have shown their advantages with respect to predictive accuracy in past studies. However, there are three issues which can limit the application of these approaches in practice. First, the time and space complexity of popular DES approaches are high, and therefore, it would be challenging to deploy them for large-volume or real-time classification tasks (e.g., real-time payment risk evaluation, etc.). The complexity mainly comes from the neighbor sample searching step, which needs to store all the training/ validation data in space, and to sort the distances between the target sample and the training/validation data. Also, ranking the performance of all the base classifiers takes extra time, especially when there are many candidate models. This computational complexity issue has drawn attention in a few latest studies. Second, the ensemble method is typically limited to voting or weighted average after finding the most competent base classifiers. This is because the baseline machine learning model combination varies sample by sample. It is difficult to use more flexible ensemble options such as stacking classifiers, on top of the changing baseline machine learning model combinations. Third, the DES approaches typically select competent baseline machine learning models according to their accuracy on certain training or validation samples. However, accuracy is not always a good measure for ranking models, especially when data are class-imbalanced and the costs of false positive versus false negative predictions are different. Some studies (e.g., DES-MI, etc.) tried weighting or re-sampling different classes when measuring model competence levels. Still, there is a need for a more flexible option that allows easy integration of any popular evaluation metrics (e.g., Precision-Recall, F1 score, etc.) in the selective ensemble process.

Non-limiting embodiments or aspects of the present disclosure provide methods, systems, and computer program products for ensemble learning that (i) for each baseline machine learning model of a set of baseline machine learning models, with at least one processor: train that baseline machine learning model based on a plurality of first training samples, wherein the plurality of first training samples includes a plurality of different data types, and wherein training that baseline machine learning model generates a plurality of first predictions for the plurality of first training samples; generate for that baseline machine learning model, based on the plurality of first predictions for the plurality of first training samples, a rejection region associated with at least one data type of the plurality of different data types; and process, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model, wherein a baseline model predictive performance metric for that baseline machine learning model is determined based on the subset of second predictions of that baseline machine learning model, and wherein the plurality of second training samples is associated with a plurality of rejection flags for that baseline machine learning model, wherein each rejection flag of the plurality of rejection flags indicates whether a corresponding second sample of the plurality of second samples is within the rejection region of that baseline machine learning model; (ii) generate a global rejection region associated with one or more data types of the plurality of different data types based on the rejection region associated with each baseline machine learning model; (iii) train an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, (c) the subset of second predictions for the subset of second training samples generated for each baseline machine learning model, wherein training the ensemble machine learning model generates a subset of ensemble predictions for the further subset of second training samples of the plurality of second training samples outside the global rejection region, and wherein an ensemble model predictive performance metric is determined based on the subset of ensemble predictions and/or (d) the plurality of distance measures for the plurality of second samples associated with each baseline machine learning model, and provide, as output, the subset of ensemble predictions; (iv) update, based on the baseline model predictive performance metric for each baseline machine learning model, the set of baseline machine learning models; and (v) repeat (i)-(iv) until there is a single baseline machine learning model in the set of baseline machine learning models or at least one of the ensemble model predictive performance metric satisfies a threshold ensemble model predictive performance, a ratio of the plurality of second training samples outside the global rejection region satisfies a threshold ratio, or any combination thereof.

In this way, non-limiting embodiments or aspects of the present disclosure provide a new selective ensemble learning approach that addresses the above limitations of existing DES approaches. Non-limiting embodiments or aspects of the present disclosure consider the concept of "classification with rejection" into ensemble learning. Classification with rejection was initially proposed to handle scenarios where wrong predictions lead to much worse consequences than making no predictions. Such scenarios are quite common in practice (e.g., in evaluating transaction risk with high payment amount, in diagnosis of critical disease, etc.) Non-limiting embodiments or aspects of the present disclosure define a rejection region for each baseline machine learning model according to the model performance regarding different data patterns. Instead of using accuracy only, any common evaluation metrics can be easily adopted at this step. Each derived rejection region represents a group of data where the corresponding baseline machine learning model has low credibility. A global rejection region is then developed, where no baseline machine learning models can provide credible predictions for samples within the global rejection region. This global rejection region enables non-limiting embodiments or aspects of the present disclosure to avoid risky predictions on highly unconfident sample patterns. Non-limiting embodiments or aspects of the present disclosure further consider data beyond the global rejection region for ensemble machine learning modeling. Specifically, non-limiting embodiments or aspects of the present disclosure use two types of rejection-related measures, and build a meta-model on top of the two types of rejection-related measures for final predictions. These new measures capture 1) the rejection status of each baseline machine learning model, and 2) the uncertainty in the rejection region derivation. The meta-model can be any classifier, or any voting/bagging algorithm. In this way, non-limiting embodiments or aspects of the present disclosure enable the ensemble machine learning model to learn how to use the base classifiers regarding different data patterns, which avoids the complexity in ranking baseline machine learning models and also the restrictions in output aggregation.

Accordingly, non-limiting embodiments or aspects of the present disclosure (i) enable a new selective ensemble approach with rejection option, which significantly reduces the space and time complexity needed for making predictions (a main limitation of popular DES approaches); (ii) enable any common evaluation metrics to be used for baseline machine learning model competence measure, instead of accuracy only that are used in popular DES approaches, which may be particularly useful for cases like imbalanced data classification, where the costs of false positive and false negative are usually different; (iii) develop a global rejection region which indicates if an ensemble machine learning model can make credible predictions on given samples, rather than providing classification scores only; (iv) and generate two types of rejection-related measures for ensemble machine learning modeling, which quantify the competence level of each baseline machine learning model for any given sample; and/or (v) provide a meta-model that provides higher flexibility for baseline machine learning model aggregation.

Referring now to FIG. 1, FIG. 1 shows an electronic payment processing network 100 according to non-limiting embodiments or aspects. The payment processing network may be used in conjunction with the systems and methods described herein. It will be appreciated that the particular arrangement of electronic payment processing network 100 shown is for example purposes only, and that various arrangements are possible. Transaction processing system 101 (e.g., a transaction handler) is shown to be in communication with one or more issuer systems (e.g., such as issuer system 106) and one or more acquirer systems (e.g., such as acquirer system 108). Although only a single issuer system 106 and single acquirer system 108 are shown, it will be appreciated that transaction processing system 101 may be in communication with a plurality of issuer systems and/or acquirer systems. In some embodiments, transaction processing system 101 may also operate as an issuer system such that both transaction processing system 101 and issuer system 106 are a single system and/or controlled by a single entity.

In some non-limiting embodiments or aspects, transaction processing system 101 may communicate with merchant system 104 directly through a public or private network connection. Additionally or alternatively, transaction processing system 101 may communicate with merchant system 104 through payment gateway 102 and/or acquirer system 108. In some non-limiting embodiments or aspects, an acquirer system 1108 associated with merchant system 104 may operate as payment gateway 102 to facilitate the communication of transaction requests from merchant system 104 to transaction processing system 101. Merchant system 104 may communicate with payment gateway 102 through a public or private network connection. For example, a merchant system 104 that includes a physical POS device may communicate with payment gateway 102 through a public or private network to conduct card-present transactions. As another example, a merchant system 104 that includes a server (e.g., a web server) may communicate with payment gateway 102 through a public or private network, such as a public Internet connection, to conduct card-not-present transactions.

In some non-limiting embodiments or aspects, transaction processing system 101, after receiving a transaction request from merchant system 104 that identifies an account identifier of a payor (e.g., such as an account holder) associated with an issued payment device 110, may generate an authorization request message to be communicated to the issuer system 106 that issued the payment device 110 and/or account identifier. Issuer system 106 may then approve or decline the authorization request and, based on the approval or denial, generate an authorization response message that is communicated to transaction processing system 101. Transaction processing system 101 may communicate an approval or denial to merchant system 104. When issuer system 106 approves the authorization request message, it may then clear and settle the payment transaction between the issuer system 106 and acquirer system 108.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
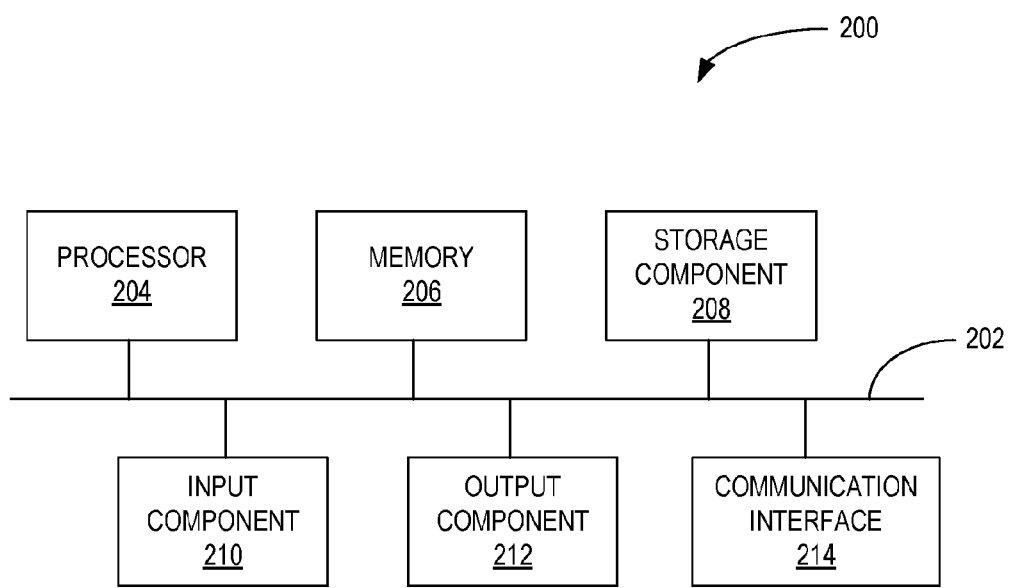
FIG. 2 is a schematic diagram of example components of one or more devices of FIG. 1, according to some non-limiting embodiments or aspects

Referring now to FIG. 2, shown is a diagram of example components of a device 200 according to non-limiting embodiments. Device 200 may correspond to transaction processing system 101, payment gateway 102, merchant system 104, issuer system 106, acquirer system 108, and/or consumer device 110, as an example. In some non-limiting embodiments, such systems or devices may include at least one device 200 and/or at least one component of device 200. The number and arrangement of components shown are provided as an example. In some non-limiting embodiments, device 200 may include additional components, fewer components, different components, or differently arranged components than those shown. Additionally, or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid-state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Figure 4:
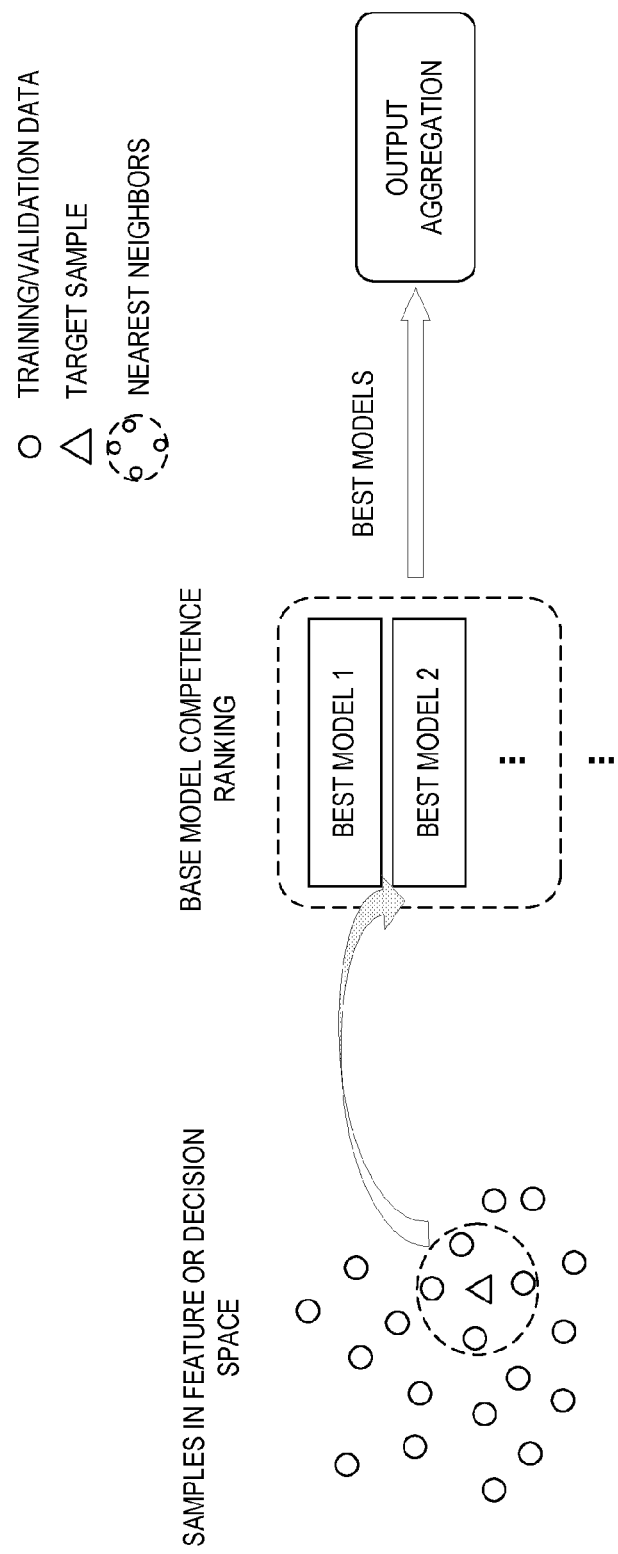
FIG. 4 shows a process of typical dynamic ensemble selection (DES) approaches at an inference stage.

Dynamic Ensemble Selection (DES) aims to find the most competent baseline machine learning models from all the candidates for each sample to be classified. Referring now to FIG. 4, FIG. 4 shows a process of typical DES approaches at the inference stage. Common DES approaches start by defining a local region around the target sample to be predicted (e.g., neighbors from training or validation data, etc.). Different algorithms are then used in defining and ranking the competence levels of the base classifiers.

Consider $C=[C_1, \ldots, C_M]$ as M base classifiers, $(x_i, y_i)$ as the features and label of the ith sample from the training or validation set (i=1, . . . , N where N is the sample size), and $x_{test, j}$ as the features of the jth sample $s_{test, j}$ to be predicted. The first step in common DES approaches is to find neighbor samples of $s_{test, j}$. Methods such as K-nearest oracle-Eliminate (KNORA-E), K-nearest oracle-Union (KNORA-U), diversity enhanced KNN-based selection (DES-KNN) decide the neighbor samples based on similarity of feature values (e.g., distances between $x_{test, j}$ and $[x_1, \ldots, x_N]$). Methods such as K-nearest Output Profiles (KNOP) perform the neighbor searching based on similarity of decisions from the baseline machine learning models. Alternatively, probabilistic approaches, such as Randomized Reference Classifier (RRC) and Kullback-Leibler divergence-based selection (DES-KL), use a kernel function (e.g., Gaussian or Exponential kernel, etc.) to quantify the distances between $s_{test,j}$ and the training or validation samples. Besides the different options for defining neighbors using sample-level measures, a few studies have tried to reduce the computational burden with cluster level neighbor searching, for example, K-means based selection and fuzzy hyper-box based selection. As a trade-off of reduced computational costs, past studies noted that outputs from cluster-level selections may be less precise than sample-level neighbor selections.

Denoting $s=[s_1, \ldots, s_K]$ as the selected neighbor samples above, the next step of DES is to measure and rank the competence level of each baseline machine learning model in C using s. Again, multiple algorithms have been proposed at this step. Probabilistic approaches (e.g., RRC, DES-KL, etc.) estimate the probability of making an accurate prediction from each baseline machine learning model on $s_{test,j}$, based on the models' performance on s weighted by a pre-defined kernel function. KNOP, KNORA-E, KNORA-U, and variants of these methods measure the competence of baseline machine learning models based on the number of accurate predictions made from each model on the samples in s. Also, similarity-based weights may be considered in the accuracy measure when ranking model competence, to capture the pattern difference between each sample in s and the target point $s_{test,\ j}$. Meta-learning ensemble selection (META-DES) builds a separate learner to rank the competence levels of the baseline machine learning models. Features considered in the learner include both the accuracy of each baseline machine learning model on the neighbors s, and the level of disagreement of the baseline machine learning models on predicting s. Entropy measures (e.g., cross entropy of the prediction from each baseline machine learning model, etc.) are also used for quantifying baseline machine learning model competence. The entropy measures consider the same contribution of every class and may be inappropriate for class-imbalanced ensemble selection.

Denoting $C_{test,\ j}=[C_{test,j}^1, \ldots, C_{test,j}^K]$ as the K baseline machine learning models selected for sample $s_{test,\ j}$ after competence ranking, ensemble predictions can be made by aggregating the outputs from $C_{test,\ j}$ using either weighted majority vote (if outputs are hard classifications) or weighted average score (if outputs are soft classifications). Taking soft classifications as an example, the predictions from typical DES approaches on $s_{test,\ j}$ may be formulated according to the following Equation (1):

$$P_{test,j}^{DES} = \sum_k w^k P_{test,j}^k \tag{1}$$

Where $p_{test,j}^{DES}$ represents the classification score (e.g., a scalar for binary classification, etc.), and $w^k$ is the weight of baseline machine learning model k, usually decided based on the competence measure (e.g., higher weights for baseline machine learning models with higher competence rankings, etc.). The special case $w^k=1$ corresponds to the mean of all the based model outputs.

Limitations of existing DES approaches following the three stages reviewed herein are now summarized. At the neighbor selection stage, existing DES approaches need to find the sample points most similar to the target sample $s_{test,\ j}$, which requires a calculation and ranking of similarity between $s_{test,\ j}$ and training or validation samples. The computational cost can be huge when the sample space or feature dimension is large. At the baseline machine learning model competence ranking stage, extra time cost is needed to measure and rank the competence levels of the baseline machine learning models for every new sample $s_{test,\ j}$. Besides, only accuracy is used to rank the competence level using the neighbor samples, so the resulting model combination for next step ensemble may be sub-optimal (e.g., especially for imbalanced data classifications, etc.). At the output aggregation stage, only voting or weighted average is used in existing approaches. It is difficult to apply more flexible ensemble techniques on varying baseline machine learning model combinations. In practice, computational efficiency and flexibility are useful when deploying classification models. Non-limiting embodiments or aspects of the present disclosure provide a more efficient and flexible solution for selective ensemble learning, which includes the concept of classification with rejection introduced herein.

Figure 5:
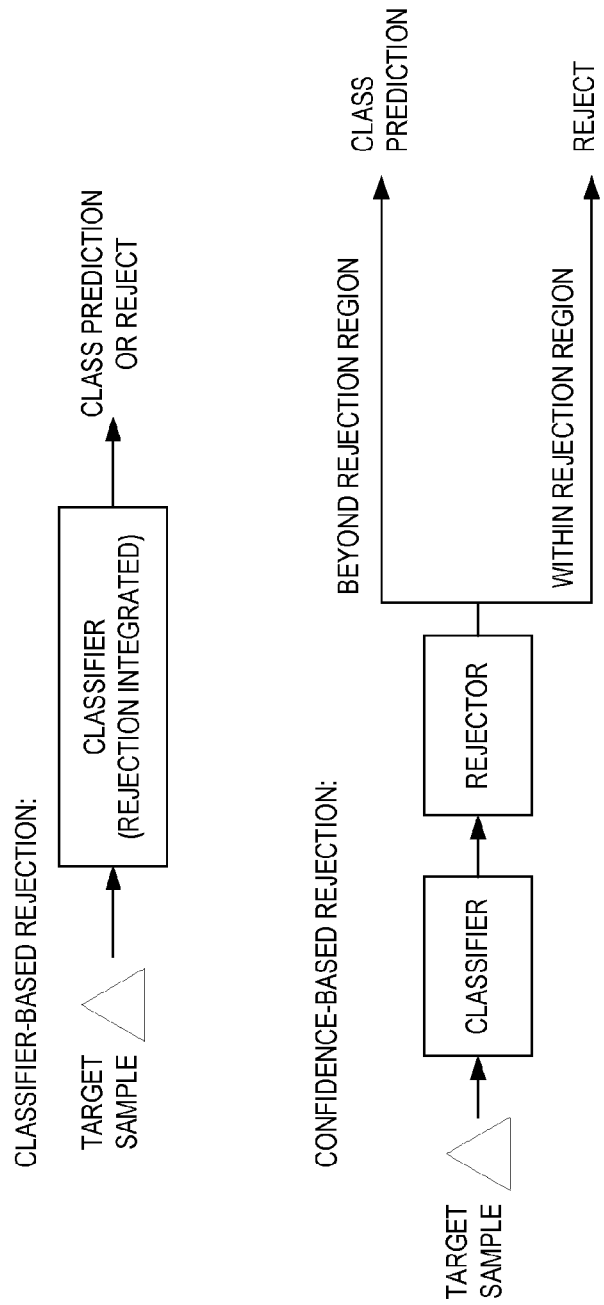
FIG. 5 is a flow diagram showing a logic behind classifier-based rejection and confidence-based rejection.

Rejection is an option that improves the credibility of a developed model. Instead of providing a class or classification scores for every sample, a classifier with rejection option first judges whether the model can provide a confident prediction for the sample or not. Only if the model has sufficient confidence, is a prediction provided. The rejected samples are those associated with low model performance, and therefore, may be handled by other methods. There are two approaches for deriving a rejection region of a model, namely classifier-based rejection and confidence-based rejection. Referring now to FIG. 5, FIG. 5 is a flow diagram showing a logic behind classifier-based rejection and confidence-based rejection. A difference between classifier-based rejection and confidence-based rejection is whether the rejection region is decided during the training process of a classifier or derived using the outputs from a trained classifier.

Classifier-based rejection considers "rejection" as a possible output besides the regular classes when training a classification model. A modified loss function with rejection loss integrated is used to train such a classifier. The training process learns what samples the model should reject, such that the total loss across all the considered samples is minimized. For an arbitrary training sample $s_n$, a general loss $L_n$ can be defined according to Equation (2):

$$L_n = \begin{cases} l_T & \text{if } q_n = y_n \\ l_F & \text{if } q_n \neq y_n \\ l_R & \text{otherwise} \end{cases} \tag{2}$$

where $q_n$ is the hard classification from a given model; $l_T$ is the loss for a correct prediction, usually set as 0; $l_F$ is the loss for an incorrect prediction, usually set as a positive value; and $l_R$ is the loss of rejecting $s_n$ from decision makings, satisfying $l_T < l_R < l_F$, such that a cost of making a wrong prediction is higher than giving no predictions. There are a few variants of the general loss $L_n$ described herein. For example, a cost-sensitive loss is such that rejecting different classes (e.g., minority vs majority class of an imbalanced dataset, etc.) is associated with different costs. An advantage of classifier-based rejection is that the class prediction and rejection/acceptance decision may be obtained within one learning process. However, the loss $l_R$ may be carefully designed and tuned, as some metrics can be sensitive to the value of the loss $l_R$ (e.g., rejection ratio, model performance, etc.).

A confidence-based rejection approach trains a classifier without considering any rejection related loss. The rejection region is decided via a rejector, based on the classification score, which reflects the confidence of a classifier on a given sample. A general decision making process for a rejector may be defined according to the following Equation (3):

$$q_n = \begin{cases} I(P_n) & \text{if } P_n \notin R \\ \text{reject} & \text{if } P_n \in R \end{cases} \quad (3)$$

where R is a range of scores to be rejected from making predictions (i.e., the rejection region); and $I(P_n)$ is a class decision function using the score $P_n$. The rejection region R may be defined based on the classifier's predictive performance.

Figure 6:
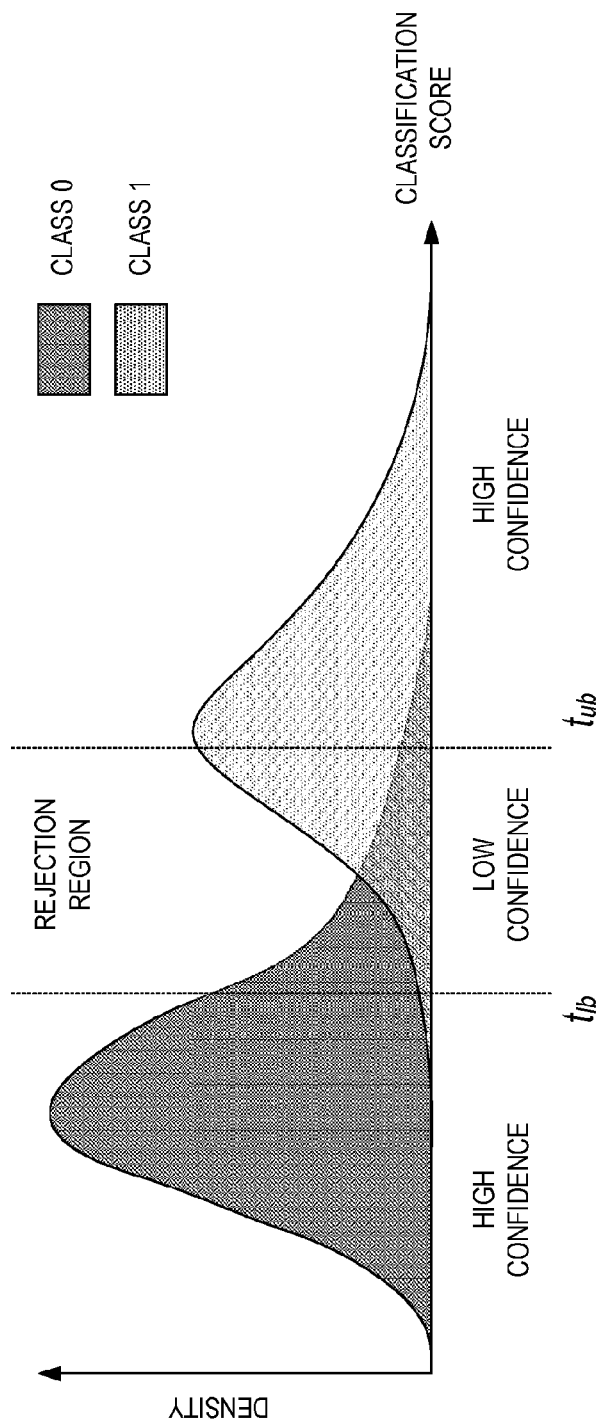
FIG. 6 is a graph showing how a rejection region is decided using example scores for a binary classification.

Referring now to FIG. 6, FIG. 6 is a graph showing how a rejection region R is decided using example scores for a binary classification. As shown in FIG. 6, the classifier has low confidence for intermediate-score samples, and high confidence for low-score or high-score samples. The classifier's predictive performance of the low-confidence region is be much lower than the high-confidence region. A rejector may reject samples with scores in between a certain range, based on the change of predictive performance after rejecting these samples, and the rejection ratio. For example, the rejection region $[t_{lb}, t_{ub}]$ may be obtained by optimizing an objective function defined according to the following Equation (4):

$$\text{argmin}_{(t_{lb}, t_{ub})} t_{ub} - t_{lb} \quad (4)$$

with $t_{lb} < t_{ub}$; $\in_{left} < \tau_{left}$; $\in_{right} < \tau_{right}$ where $\in_{left}$ and $\in_{right}$ represent the inaccuracy rates for samples whose scores are smaller than $t_{lb}$ or higher than $t_{ub}$, respectively; $\tau_{left}$ and $\tau_{right}$ are the tolerant inaccuracy rates correspondingly. Equation (4) finds a smallest score range to reject, given a bottom-line accuracy after rejection. Several other options which define the rejection region with a similar goal (e.g., reaching a promising predictive performance after rejecting a small number of unconfident samples, etc.) can be found in existing literature. Note that the model confidence discussed in this section is different from the confidence of a classification score or probability. For the latter case, measures such as confidence interval can be used to capture the uncertainty in decision making. The rejection region, however, is derived using point estimates of classification scores.

Figure 3A:
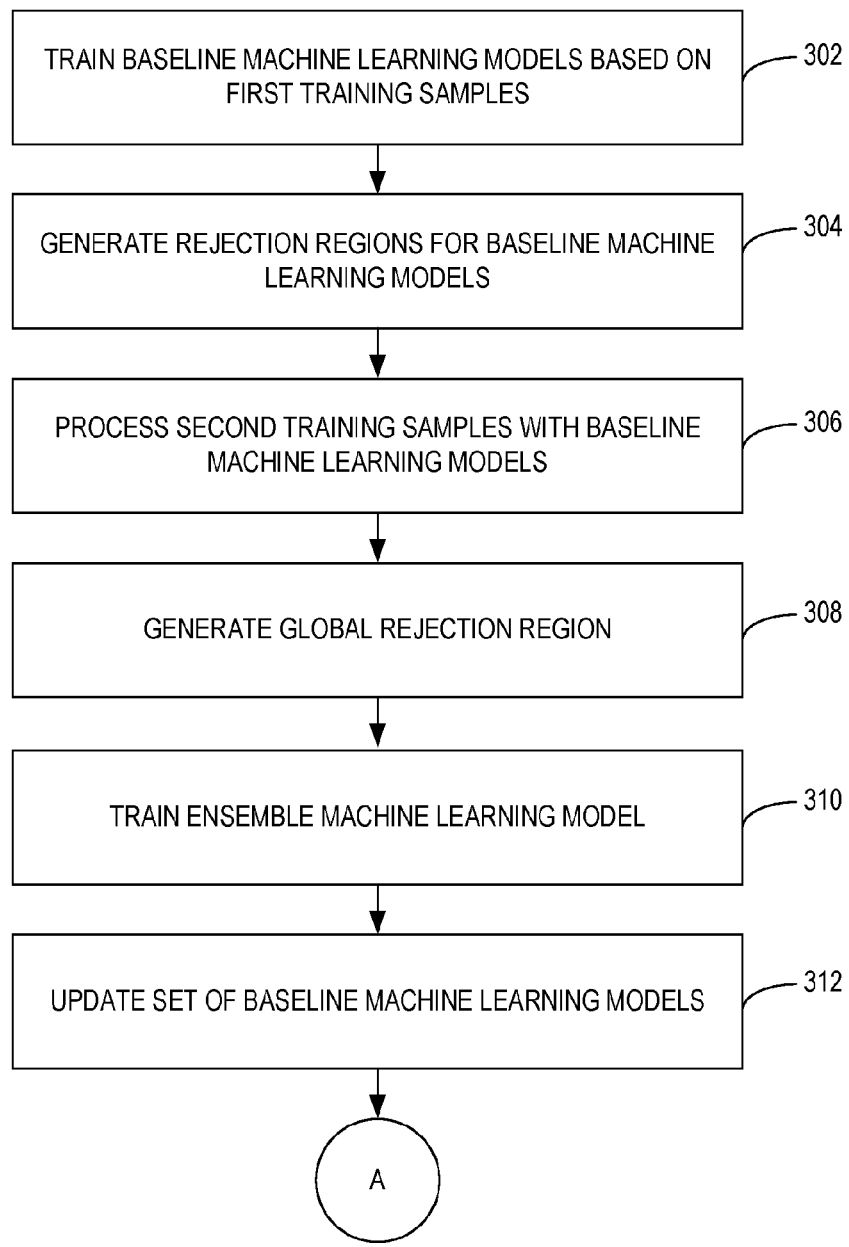
FIGS. 3A and 3B are a flow diagram of a method for ensemble learning, according to some non-limiting embodiments or aspects.
Figure 3B:
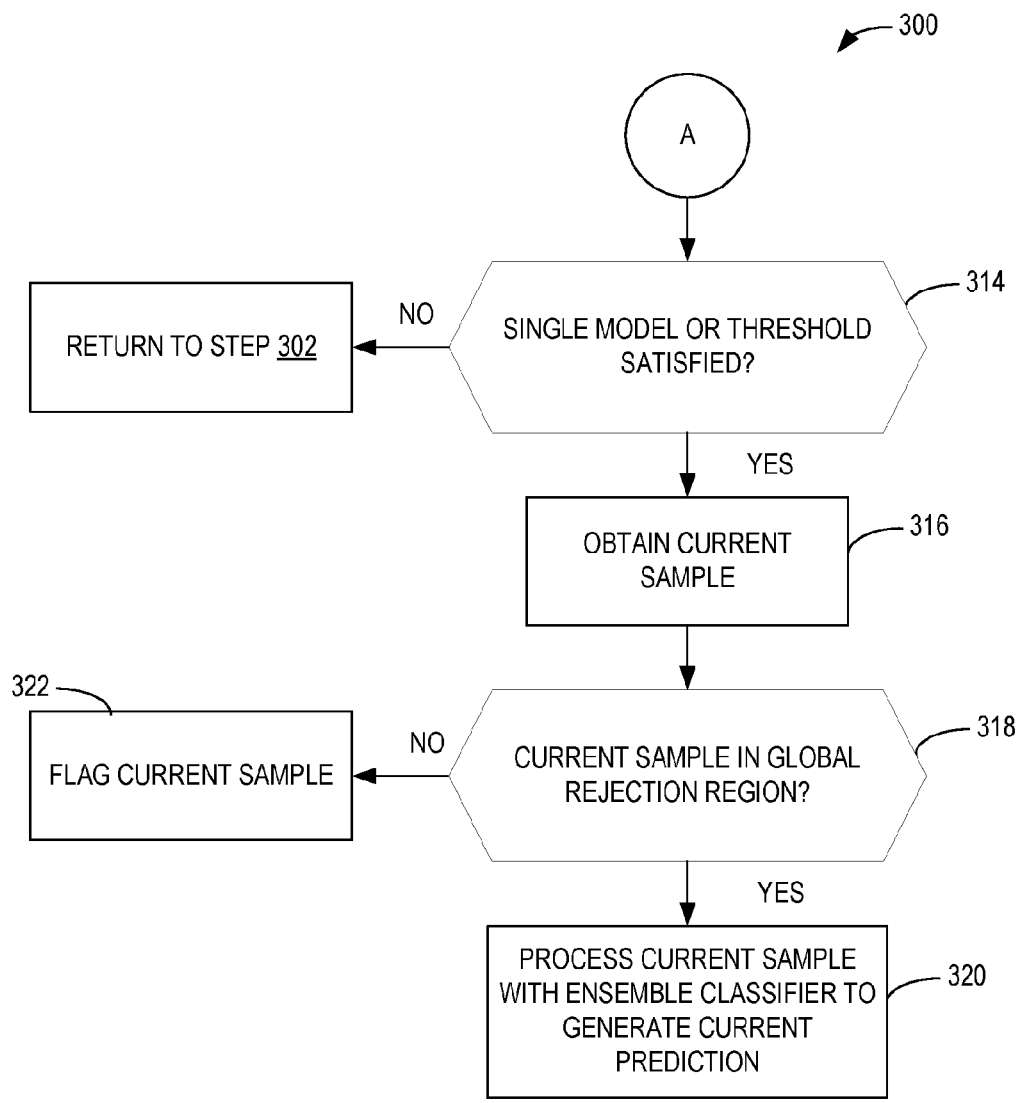

Referring now to FIGS. 3A and 3B, shown is a flow diagram for a method 300 for ensemble learning, according to some non-limiting embodiments or aspects. The steps shown in FIG. 3 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step.

As shown in FIG. 3A, at step 302, method 300 includes, for each baseline machine learning model of a set of baseline machine learning models, training that baseline machine learning model based on a plurality of first training samples. For example, transaction processing system 101 may, for each baseline machine learning model of a set of baseline machine learning models, train that baseline machine learning model based on a plurality of first training samples. The plurality of first training samples may include a plurality of different data types. Training that baseline machine learning model may generate a plurality of first predictions for the plurality of first training samples. For example, each baseline machine learning model may be trained using machine learning or other artificial intelligence techniques to accept, as input, the plurality of first training samples (e.g., feature representations associated with the plurality of first training samples, etc.) and provide, as output, the plurality of first predictions for the plurality of first training samples.

In some non-limiting embodiments or aspects, the plurality of first training samples may include a plurality of payment transactions, such as payment transactions configured to be processed in electronic payment processing network 100. As an example, a payment transaction may include transaction parameters and/or features associated with the payment transaction.

Transacting parameters and/or features (e.g., categorical features, numerical features, local features, graph features or embeddings, etc.) associated with a payment transaction may include may include transaction parameters of the transaction, features determined based thereon (e.g., using feature engineering, etc.), and/or the like, such as an account identifier (e.g., a PAN, etc.), a transaction amount, a transaction date and/or time, a type of products and/or services associated with the transaction, a conversion rate of currency, a type of currency, a merchant type, a merchant name, a merchant location, and/or the like. However, non-limiting embodiments or aspects are not limited thereto, and transaction parameters and/or features of a transaction may include any data including any type of parameters associated with any type of transaction.

As shown in FIG. 3A, at step 304, method 300 includes, for each baseline machine learning model of a set of baseline machine learning models, generating, for that baseline machine learning model, based on the plurality of first predictions for the plurality of first training samples, a rejection region associated with at least one data type of the plurality of different data types. For example, transaction processing system 101 may, for each baseline machine learning model of a set of baseline machine learning models, generate, for that baseline machine learning model, based on the plurality of first predictions for the plurality of first training samples, a rejection region associated with at least one data type of the plurality of different data types.

Non-limiting embodiments or aspects of the present disclosure provide a selective ensemble learning with rejection approach for binary classification. Non-limiting embodiments or aspects of the present disclosure may define a rejection region for each base classifier, generate a global rejection region, and incorporate rejection/acceptance status into ensemble machine learning modeling.

For each baseline machine learning model of the set of baseline machine learning models, transaction processing system 101 may generate, for that baseline machine learning model, based on the plurality of first predictions for the plurality of first training samples, the rejection region associated with the at least one data type of the plurality of different data types by optimizing an objective function defined according to the following Equation (5):

$$\text{argmax}_{(t_{lb})} T_{acc}(t_{lb}) \quad (5)$$

with $0 < t_{lb} < 1$; $N_{rej}/N = a\ \%$;

and any other constraints of interest where $t_{lb}$ is a lower bound of the rejection region; $T_{acc}$ is a model performance evaluation metric of that baseline machine learning model calculated using first samples of the plurality of samples outside the rejection region (e.g., an interested model performance evaluation metric, calculated using data within the acceptance region, etc.); $N_{rej}$ is a number of the plurality of first samples rejected with scores in the rejection region (e.g., the number of samples being rejected etc.); N is number of the plurality of first samples in total; and a % is a user-defined rejection ratio limit for that baseline machine learning model.

There may be only one parameter $t_{lb}$ to be calculated, as the upper bound of rejection region $t_{ub}$ may be fixed given a certain value of $t_{lb}$ and the rejection ratio a %. Therefore, the optimal solution of $t_{lb}$ can be easily obtained using a searching or an optimization algorithm. As noted in existing studies on classification with rejection, the performance after rejection (i.e., $T_{acc}$) typically increases with a %. This is because the more uncertain samples removed from decision makings, the higher confidence (and consequently better performance) the classifier has on the remaining samples. This hyper-parameter a % is related with both the performance of the ensemble machine learning model and the global rejection ratio introduced herein. Non-limiting embodiments or aspects of the present disclosure may test different values of a % and decide a % by checking how the key metrics change with different choices. Popular hyper-parameter tuning methods may also be applied.

In some non-limiting embodiments or aspects, an optimal solution of $t_{lb}$ is obtained using at last one of the following searching or optimization algorithms: a Grid search, a Bayesian optimization, a Simulated annealing, a Genetic algorithm, a Particle swarm optimization, or any combination thereof.

Once the optimal value of $t_{lb}$ for each base classifier is obtained, non-limiting embodiments or aspects of the present disclosure may obtain the rejection region of each classifier. Different from traditional classification with rejection methods that stop at this step, non-limiting embodiments or aspect of the present disclosure move define global rejection and acceptance regions as described herein, which may be used for the ensemble machine learning modeling.

As shown in FIG. 3A, at step 306, method 300 includes, for each baseline machine learning model of a set of baseline machine learning models, processing, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model. For example, transaction processing system 101 may, for each baseline machine learning model of a set of baseline machine learning models, processing, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model. A baseline model predictive performance metric for that baseline machine learning model may be determined based on the subset of second predictions of that baseline machine learning model. The plurality of second training samples may be associated with a plurality of rejection flags for that baseline machine learning model. Each rejection flag of the plurality of rejection flags may indicate whether a corresponding second sample of the plurality of second samples is within the rejection region of that baseline machine learning model.

In some non-limiting embodiments or aspects, the plurality of second training samples may include a plurality of payment transactions, such as payment transactions configured to be processed in electronic payment processing network 100. As an example, a payment transaction may include transaction parameters and/or features associated with the payment transaction.

As shown in FIG. 3A, at step 308, method 300 includes generating a global rejection region associated with one or more data types of the plurality of different data types based on the rejection region associated with each baseline machine learning model. For example, transaction processing system 101 may generate a global rejection region associated with one or more data types of the plurality of different data types based on the rejection region associated with each baseline machine learning model.

Denoting $R_1, \ldots, R_M$ as the rejection regions of the M base classifiers, non-limiting embodiments or aspect of the present disclosure define a global rejection region $R_G$ as the intersection of all the baseline machine learning model rejection regions. The $R_G$ represents the types of data where no baseline machine learning model would include in decision makings. If a new sample to be predicted falls within $R_G$, the baseline machine learning models all have low confidence in making predictions on it. As a result, such sample may be handled by other methods to avoid any biased performance measure. Oppositely, if a sample falls into the complement region of $R_G$, i.e., $A_G$, there is at least one baseline machine learning model considering this sample in the decision making. $A_G$ is thus referred to as a global acceptance region.

Figure 7:
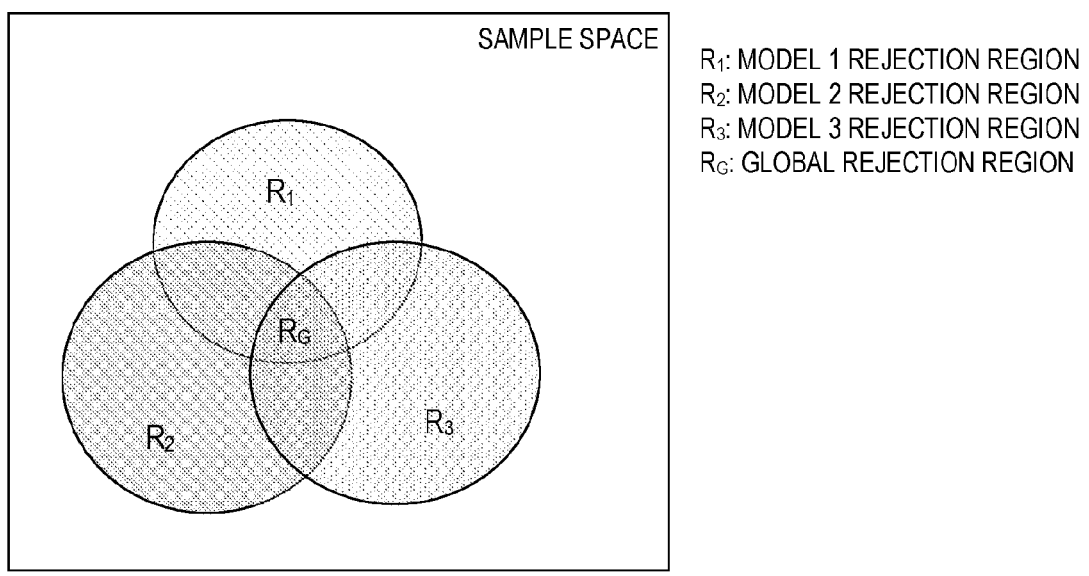
FIG. 7 is a graph illustrating a relationship between base and global rejection regions.

Compared to the rejection region from one base classifier, $R_G$ returns a significantly reduced rejection ratio (e.g., equivalently an increased global acceptance ratio, etc.). Referring now to FIG. 7, FIG. 7 is a graph illustrating a relationship between base and global rejection regions, including the relationship between $R_G$ and the baseline machine learning models' rejection regions using three base classifiers as an example. Non-limiting embodiments or aspects of the present disclosure provide an intelligent way to ensemble the baseline machine learning models considering the individual rejection/acceptance status, such that the final model may have a much higher coverage, while possessing a global credibility measure (i.e., $A_G$ and $R_G$) for samples to be predicted besides assigning a classification score.

As shown in FIG. 3A, at step 310, method 300 includes training an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model. For example, transaction processing system 101 may train an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model. Training the ensemble machine learning model may generate a subset of ensemble predictions for the further subset of second training samples of the plurality of second training samples outside the global rejection region. An ensemble machine learning model predictive performance metric may be determined based on the subset of ensemble predictions. For example, the ensemble machine learning model may be trained using machine learning or other artificial intelligence techniques to accept, as input, a) a further subset of second training samples of the plurality of second training samples outside the global rejection region, (b) the plurality of rejection flags for the plurality of second samples associated with each baseline machine learning model, (c) the subset of second predictions for the subset of second training samples generated for each baseline machine learning model, and/or (d) the plurality of distance measures for the plurality of second samples associated with each baseline machine learning model, and provide, as output, the subset of ensemble predictions.

In some non-limiting embodiments or aspects, for each baseline machine learning model of the set of baseline machine learning models, the plurality of second training samples is associated with a plurality of distance measures, and each distance measure of the plurality of distance measures indicates a distance of a corresponding second sample from at least one boundary of the rejection region of that baseline machine learning model. In such an example, transaction processing system 101 may training of the ensemble machine learning model may be further based on (d) the plurality of distance measures for the plurality of second samples associated with each baseline machine learning model.

As described herein, an issue of existing DES approaches is the lack of flexibility in aggregating baseline machine learning model outputs. To address this issue, non-limiting embodiments or aspects of the present disclosure may use a meta-model for ensemble while considering rejection-based features as inputs, non-limiting embodiments or aspects of the present disclosure provide two types of new features to capture the rejection status of each base learner, including: 1) rejection flag, and 2) distance to rejection boundary. For an arbitrary sample $s_n$, the rejection flag feature may be defined as according to the following Equation (6):

$$r_m = \begin{cases} 0 & \text{if } P_n \notin R_m \\ 1 & \text{if } P_n \in R_m \end{cases} \quad (6)$$

where m=1, ..., M (i.e., one flag for each baseline machine learning model). This feature indicates if the sample is within the local rejection region of a candidate model considered for ensemble. This is a hard boundary separating samples into two clusters for each baseline machine learning model. To capture the uncertainties in the separation (e.g., samples out of the rejection region but very close to the boundary may be associated with a low predictive confidence), non-limiting embodiments or aspects of the present disclosure may provide another type of features as defined according to the following Equation (7):

$$d_m = \begin{cases} \min(|P_n - t_{lb}|, |P_n - t_{ub}|) & \text{if } P_n \notin R_m \\ 0 & \text{if } P_n \in R_m \end{cases} \quad (7)$$

where feature $d_m$ is a distance measure which shows how far the sample is towards the rejection boundary, in the space of classification score.

Figure 8:
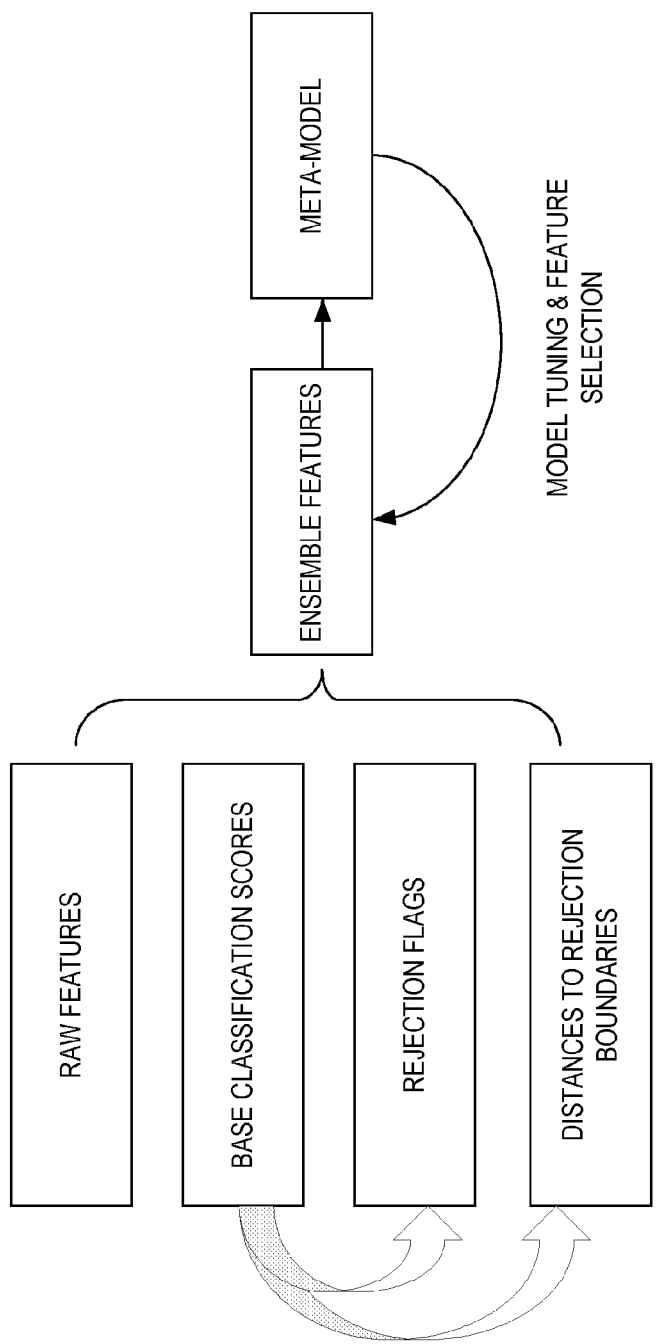
FIG. 8 illustrates example input features for meta-modeling, according to non-limiting embodiments or aspects of the present disclosure.

Using meta-model as an ensemble method enables non-limiting embodiments or aspects of the present disclosure to include different kinds of features in the ensemble learning process (which is unavailable in most DES approaches). FIG. 8 illustrates example input features for meta-modeling, according to non-limiting embodiments or aspects of the present disclosure. In addition to the two types of rejection-related features introduced herein, non-limiting embodiments or aspects of the present disclosure may consider the base classification scores and/or the raw features. Note that feature selection can be easily performed before and during the ensemble machine learning model training, which is the same as developing any traditional classification models. Therefore, non-limiting embodiments or aspects of the present disclosure can always start with a comprehensive set of features for ensemble meta-modeling.

As shown in FIG. 3A, at step 312, method 300 includes updating based on the baseline model predictive performance metric for each baseline machine learning model, the set of baseline machine learning models. For example, transaction processing system 101 may update, based on the baseline model predictive performance metric for each baseline machine learning model, the set of baseline machine learning models. As an example, transaction processing system 101 may remove a baseline machine learning model with a lowest or worst baseline model predictive performance metric from the set of baseline machine learning models.

Figure 9:
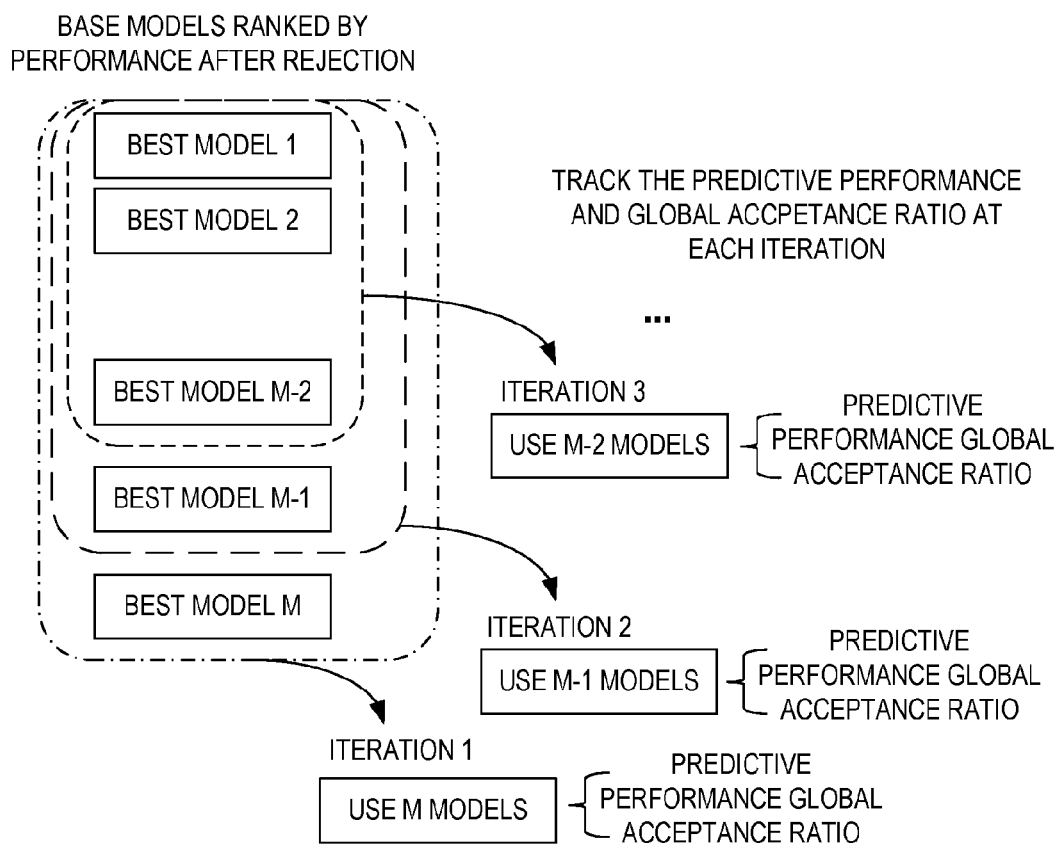
FIG. 9 illustrates a backward baseline machine learning model selection process for ensemble learning, according to non-limiting embodiments or aspects of the present disclosure.

Non-limiting embodiments or aspects of the present disclose may decide which and how many baseline machine learning models to consider for the ensemble learning. Like the baseline machine learning model rejection ratio a %, there may be two useful metrics dependent on this decision, including the ensemble machine learning model performance, and the global rejection or acceptance ratio. Non-limiting embodiments or aspects of the present disclose may use a step-wise backward (or forward) baseline machine learning model selection process to optimize the candidates for ensemble. Referring now to FIG. 9, FIG. 9 illustrates a backward baseline machine learning model selection process for ensemble learning, according to non-limiting embodiments or aspects of the present disclosure. As shown in FIG. 9, starting from using all the M candidate base classifiers, non-limiting embodiments or aspects of the present disclosure may train an ensemble machine learning model and measure the predictive performance and the global acceptance ratio. Non-limiting embodiments or aspects of the present disclosure may remove the baseline machine learning model with the worst performance after its rejection, train an ensemble machine learning model using the remaining base classifiers, and measure the same metrics. Non-limiting embodiments or aspects of the present disclosure may repeat the process until 1) only 1 baseline machine learning model is left, or 2) the predictive performance or global acceptance ratio goes below a tolerant or threshold level. Alternatively, non-limiting embodiments or aspects of the present disclosure can perform a forward selection in a similar way but keep adding baseline machine learning models from 1 to M.

As shown in FIG. 3B, at step 314, method 300 includes determining whether there is a single baseline machine learning model in the set of baseline machine learning models or at least one of the ensemble machine learning model predictive performance metric satisfies a threshold ensemble machine learning model predictive performance, a ratio of the plurality of second training samples outside the global rejection region satisfies a threshold ratio, or any combination thereof. For example, transaction processing system 101 may determine whether there is a single baseline machine learning model in the set of baseline machine learning models or at least one of the ensemble machine learning model predictive performance metric satisfies a threshold ensemble machine learning model predictive performance, a ratio of the plurality of second training samples outside the global rejection region satisfies a threshold ratio, or any combination thereof. As an example, transaction processing system 101 may return processing to step 302 of method 300 in response to determining that there is a single baseline machine learning model in the set of baseline machine learning models or at least one of the ensemble machine learning model predictive performance metric satisfies a threshold ensemble machine learning model predictive performance, a ratio of the plurality of second training samples outside the global rejection region satisfies a threshold ratio, or any combination thereof. As an example, transaction processing system 101 may proceed processing to step 316 of method 300 in response to determining that there is not a single baseline machine learning model in the set of baseline machine learning models or at least one of the ensemble machine learning model predictive performance metric satisfies a threshold ensemble machine learning model predictive performance, a ratio of the plurality of second training samples outside the global rejection region satisfies a threshold ratio, or any combination thereof. In such an example, transaction processing system 101 may repeating steps 302 through 312 of method 300 until there is a single baseline machine learning model in the set of baseline machine learning models or at least one of the ensemble machine learning model predictive performance metric satisfies a threshold ensemble machine learning model predictive performance, a ratio of the plurality of second training samples outside the global rejection region satisfies a threshold ratio, or any combination thereof.

Figure 10:
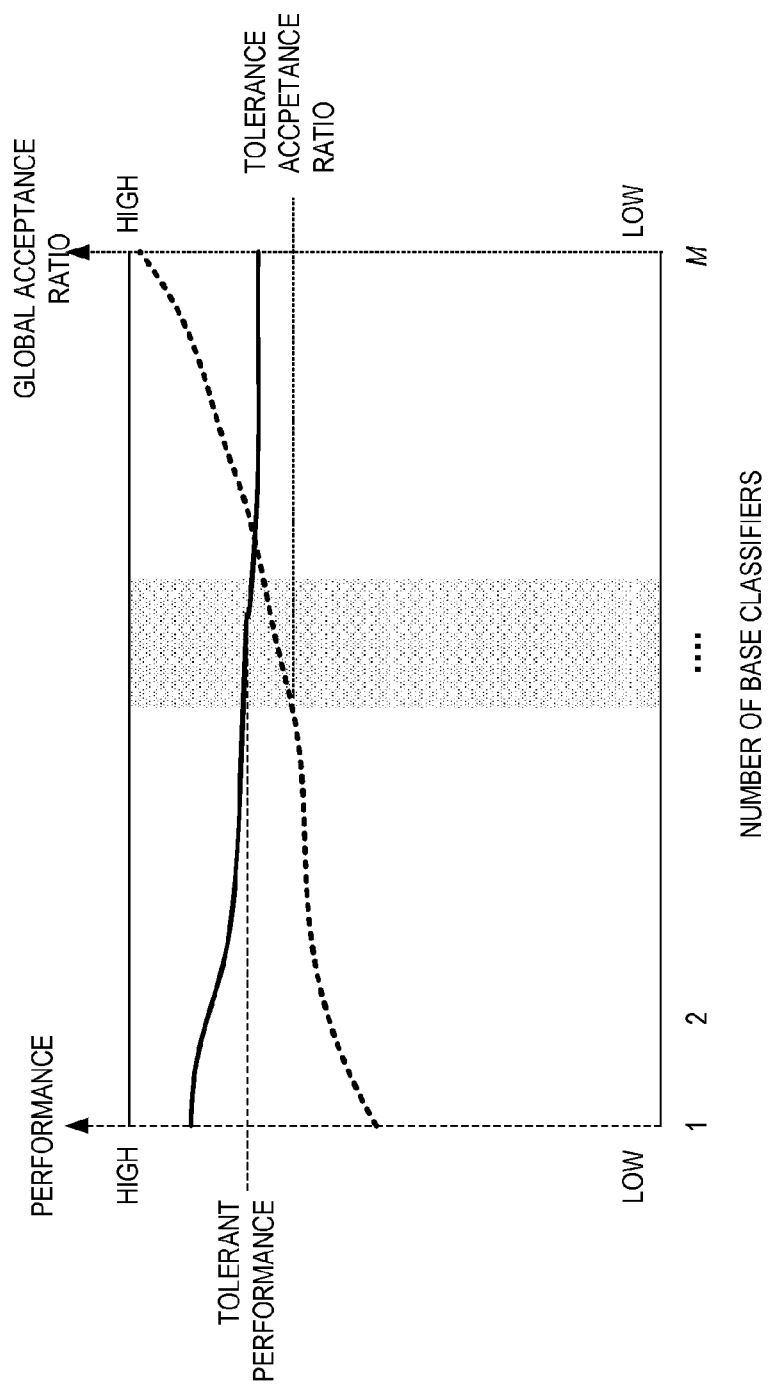
FIG. 10 illustrates an example relationship between ensemble machine learning model performance, global acceptance ratio, and a number of baseline machine learning models.

FIG. 10 illustrates an example relationship between ensemble machine learning model performance, global acceptance ratio, and a number of baseline machine learning models. This relationship may be used to decide a final number of base classifiers. Given a tolerant level of performance and acceptance ratio, the shaded area in FIG. 10 may indicate what and how many baseline machine learning models should be used. If multiple options are available, a decision can be made by prioritizing either the performance or the model coverage, or take more metrics into consideration. Performance of the developed meta-model can be evaluated in the same way as for any popular classification models.

As shown in FIG. 3B, at step 316, method 300 includes obtaining a current sample. For example, transaction processing system 101 may obtain a current sample. As an example, the current sample may include a current transaction. For example, transaction processing system 101 may receive a current payment transaction currently being processed in electronic payment processing network 100. As an example, transaction processing system 101 may receive transaction parameters and/or features associated with the current payment transaction.

As shown in FIG. 3B, at step 318, method 300 includes determining whether the current sample is within the global rejection region. For example, transaction processing system 101 may determine whether the current sample is within the global rejection region. As an example, in response to determining that the current sample is outside the global rejection region, transaction processing system 101 may proceed processing to step 320 of method 300. As an example, in response to determining that the current sample is within the global rejection region, transaction processing system 101 may proceed processing to step 322 of method 300.

As shown in FIG. 3B, at step 320, method 300 includes, in response to determining that the current sample is outside the global rejection region, automatically processing, using the ensemble machine learning model, the current sample to generate a current prediction for the current sample. For example, transaction processing system 101 may, in response to determining that the current sample is outside the global rejection region, automatically process, using the ensemble machine learning model, the current sample to generate a current prediction for the current sample. As an example, transaction processing system 101 may, in response to determining that the current payment transaction is outside the global rejection region, automatically process the current payment transaction to generate an authorization or a denial of the current payment transaction in payment processing network 100.

As shown in FIG. 3B, at step 322, method 300 includes, in response to determining that the current sample is within the global rejection region, automatically flagging the current sample as unable to receive a credible prediction from the ensemble classifier. For example, transaction processing system 101 may, in response to determining that the current sample is within the global rejection region, automatically flag the current sample as unable to receive a credible prediction from the ensemble classifier. As an example, transaction processing system 101 may, in response to determining that the current payment transaction is within the global rejection region, automatically flag the current payment transaction as unable to receive a credible prediction from the ensemble classifier. In such an example, transaction processing system 101 may, in response to flagging the current payment transaction, automatically process, using a different machine learning model than the ensemble machine learning model, the current payment transaction to generate an authorization or a denial of the current payment transaction in payment processing network 100.

Experiments

This section compares non-limiting embodiments or aspects of the present disclosure against DES methods using a number of datasets. Experiments on non-limiting embodiments or aspects of the present disclosure apply the different approaches in the modeling of twelve binary classification datasets from OpenML and UCI Machine Learning Repository, in which six datasets are highly imbalanced (minority class ratio in between 0.002 and 0.087), and the other 6 datasets are more balanced. Referring now to FIG. 11, which is a table including a description of the experiment datasets, the table of FIG. 11 lists the basic information of the datasets, including the source, the sample size and feature dimension, the minority class ratio, and the definition of each class. For the Activity Monitor and MNIST datasets, a PCA is performed first to reduce the feature size, and the returned PCA features account for 80% variability of the raw inputs. The PCA operation is to speed up the modeling process, which does not impact how non-limiting embodiments or the present disclosure or any compared DES approach works.

For each experiment, the data is randomly split into three groups: 50% for training the base classifiers, 25% for training the ensemble machine learning models, and 25% for testing. Different samples are used for training the base classifiers and the ensemble machine learning models to avoid overfitting. Next, six different base classifiers are trained, including two random forest models (RF1 and RF2), two gradient boosting models (GBM1 and GBM2), and two multi-layer perceptron models (MLP1 and MLP2). For each algorithm (i.e., random forest, gradient boosting, and multilayer perceptron), the corresponding two models are built using different portions of the base classifier training samples. Specifically, shuffle the training data is shuffled and the first 60% samples is used to train RF1, GBM1, and MLP1, and the last 60% samples is used to train RF2, GBM2, and MLP2. This portion of samples (i.e., 60% for each) is found to be big enough to provide stable results for the experiments. Note that other sampling strategies can be applied as well. A purpose of using 60% random samples is to enhance the sample-level diversity of the developed base learners.

To perform selective ensemble machine learning modeling, the rejection region of each base classifier is first derived. As discussed herein, the baseline machine learning model rejection ratio a % can be tuned considering the global acceptance/rejection ratio and the ensemble machine learning model performance. a %=10% may be considered to search the optimal value of $t_{lb}$ using Equation (5). A few different options may be tested (i.e., [2%, 5%, 10%, 15%, and 20%]) and this a %=10% provides a good balance between performance and acceptance ratio for the different experiment datasets. The best algorithm among random forest, gradient boosting, and multi-layer perceptron is then used as the meta-model for each experiment. Input variables for meta-model training include the raw features, the base classification scores, and the derived rejection-related features. Note that some features can be unimportant in the initial meta-model, and the final feature list is tuned based on the feature importance scores. Also, a backward selection is performed to check how the meta-model performance and global acceptance/rejection ratio vary with different base classifier combinations. With respect to the baseline machine learning model performance evaluation, Area Under Precision-Recall Curve (PR-AUC) is considered for the 6 imbalanced datasets, and Area Under ROC Curve (AUC) is considered for the 6 balanced datasets.

For comparison purpose, eight different DES models are built, and their performance on the test samples in each experiment is measured. The DES models considered here include: DES-KNN, KNOP, DESP, DESMI, KNORA-U, KNORA-E, META-DES, and RRC. Key hyperparameters (e.g., number of neighbors for competence measure, etc.) of these models are tuned using the same evaluation criterion as used for non-limiting embodiments of the present disclosure.

Each of the predictive performance and the inference time of different models is compared. For the six imbalanced datasets, the PR-AUC and the best F1 score from each model is calculated. For the balanced datasets, the AUC and the highest accuracy is calculated. The inference time is measured on a machine with 2.3 GHz 8-Core processor and 32 GB memory. Referring now to FIG. 12, which is a table including a performance of different models on the class-imbalanced datasets, and FIG. 13, which is a table including a performance of different models on the class-balanced data, the table of FIG. 12 and the table of FIG. 13 list these metrics from different models, for imbalanced and balanced datasets, respectively (best value in bold). Both mean values and standard deviations of the metrics are provided. Regarding non-limiting embodiments or the present disclosure, The metric values on data in the acceptance region are provided (i.e., Proposed:Acp), as well on the full test data (i.e., Proposed: All), which enables checking how the performance changes after introducing the global rejection/acceptance measure, which is a component of non-limiting embodiments or the present disclosure. Since the result of non-limiting embodiments or the present disclosure varies by the number of candidate base classifiers (equivalently the global rejection/acceptance ratio), the tables in FIGS. 11 and 12 show the outputs with all six base learners included (except for the Water Quality dataset where only the top four models are selected as MLP1 and MLP2 show much worse performance than the others). The returned global rejection ratio varies between 0 and 0.04 across different datasets, while lower than 0.01 in most cases. To validate that the decision on rejection is reasonable, the tables in FIGS. 11 and 12 also show the best performance from the base classifiers on the rejected samples (bottom row in each table).

There are four notable findings from the results in the tables of FIGS. 11 and 12. First, the inference time of non-limiting embodiments or aspects of the present disclosure is much lower than the one needed for different DES approaches. For example, the mean inference time of the Land Cover dataset varies between 57 and 73 seconds using the current DES approaches, while only about 1.3 seconds using non-limiting embodiments or aspects of the present disclosure. In practice, the sample size or feature dimension may be much higher than the tested numbers here. The reduced computational cost may thus be more significant in those scenarios. Second, the performance of base classifiers on rejected samples (bottom row in each table of FIGS. 11 and 12) is much worse than different models' performance on the accepted samples. This validates that the decision on global rejection/acceptance is reasonable. Such decision helps users avoid the cost of misleading predictions on highly unconfident samples. Third, non-limiting embodiments or aspects of the present disclosure show promising predictive performance for all the datasets (both class-imbalanced and class-balanced). Even applying non-limiting embodiments or aspects of the present disclosure on full test data with rejected samples included (i.e., Proposed: All), the performance is still comparable to the 8 DES approaches, but with a much lower cost. If we consider the nature of non-limiting embodiments or aspects of the present disclosure and apply the model on accepted samples only (i.e., Proposed: Acp), the performance is much better in almost all the experiments. Last, the lift of performance from Proposed: Acp is more significant in class imbalanced experiments. One reason is non-limiting embodiments or aspects of the present disclosure may define local rejections for the six imbalanced datasets using PR-AUC, while the compared DES approaches can only use accuracy-related measures in baseline machine learning model ranking.

The outputs of non-limiting embodiments or aspects of the present disclosure are compared with different numbers of baseline machine learning models. Referring now to FIG. 14, which is a table including a performance of different numbers of baseline machine learning models, taking the Payment Risk dataset as an example, the table of FIG. 14 shows how different metrics vary with the number of base learners for ensemble. As a comparison, the best metric values from the eight DES models are listed. First, the inference time of all different options in non-limiting embodiments or aspects of the present disclosure is four-to-five times lower than the best number from the compared DES models (i.e., DESMI). The PR-AUC and F1 score, even with the smallest rejection ratio (i.e., 0.001), is better than the highest values from the considered DES models. When comparing the performance of non-limiting embodiments or aspects of the present disclosure with different options, the performance overall decreases with the global rejection ratio decreasing.

Similar findings are obtained in the other experiments, especially the drop of performance with rejection ratio decreasing. Such drop is mainly due to the fact that more relatively low-confidence samples are considered in the decision-making process, when more base classifiers are included in meta-modeling. The meta-model performance on samples being accepted by only one or a few base classifiers can be lower than those being accepted by all base classifiers. However, it is noted that the performance change also depends on many other factors, e.g., diversity and quality of the base classifiers, label distribution of rejected samples, etc.

Figure 15:
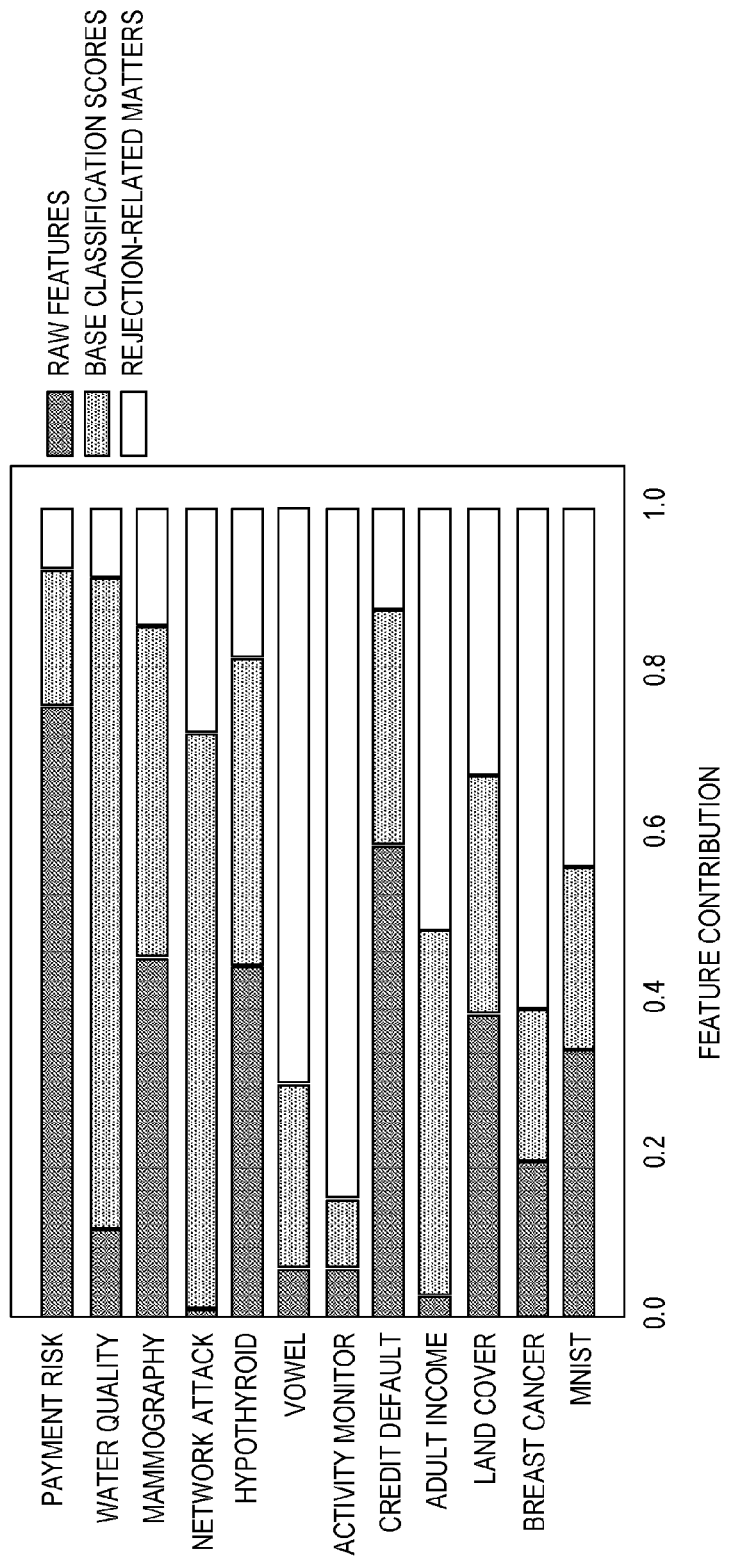
FIG. 15 is a table including a contribution of different types of features, according to non-limiting embodiments or aspects of the present disclosure.

Referring now to FIG. 15, which is a table including a contribution of different types of features, according to non-limiting embodiments or aspects of the present disclosure, FIG. 15 shows the contributions of three types of features (i.e., raw features, base classification scores, and rejection-related measures) in non-limiting embodiments or aspects of the present disclosure. The contributions are represented by feature importance scores obtained from the permutation-based approach. FIG. 15 shows that the rejection-related measures are important in most experiments. Meanwhile, the contributions of three types of features vary heavily across different datasets. For example, raw features contribute most for the Payment Risk ensemble machine learning modeling, but almost make no contribution for the Network Attack modeling, which implies that considering a variety of features as ensemble inputs at the beginning matters. Such flexibility is unavailable in the reviewed DES approaches which work on the base classification scores only.

Accordingly, non-limiting embodiments or aspects of the present disclosure provide a selective ensemble learning with rejection approach for binary classification. Compared against the existing methods, non-limiting embodiments or aspects of the present disclosure are computationally more efficient, as non-limiting embodiments or aspects of the present disclosure avoid the space and time complexity in defining neighbors and ranking base learners for each sample. By introducing a global rejection region, non-limiting embodiments or aspects of the present disclosure reduce the risk of making wrong predictions on highly unconfident data patterns. Using a meta-model for ensemble, non-limiting embodiments or aspects of the present disclosure provide higher flexibility for baseline machine learning model aggregation and enable a trade-off between model performance and coverage. Experiments show that non-limiting embodiments or aspects of the present disclosure significantly reduce the inference time, while providing promising results and reasonable rejection decisions. Non-limiting embodiments or aspects of the present disclosure can be extended to multi-class modeling, which may include the derivation of baseline machine learning model rejection regions, and the optimization of more boundary parameters. At the inference stage, there is no extra cost compared to binary classification, which implies that even for multi-class tasks the computational cost may be much lower than the computational cost from existing approaches. For example, each baseline machine learning model of the set of baseline machine learning models may include a multi-class classification model for predicting one of a number of classes q, where q is more than two classes, and wherein the rejection region of each baseline machine learning model includes a number q−1 bounds defining the rejection region.

Aspects described include artificial intelligence or other operations whereby the system processes inputs and generates outputs with apparent intelligence. The artificial intelligence may be implemented in whole or in part by a model. A model may be implemented as a machine learning model. The learning may be supervised, unsupervised, reinforced, or a hybrid learning whereby multiple learning techniques are employed to generate the model. The learning may be performed as part of training. Training the model may include obtaining a set of training data and adjusting characteristics of the model to obtain a desired model output. For example, three characteristics may be associated with a desired item location. In such instance, the training may include receiving the three characteristics as inputs to the model and adjusting the characteristics of the model such that for each set of three characteristics, the output device state matches the desired device state associated with the historical data.

In some implementations, the training may be dynamic. For example, the system may update the model using a set of events. The detectable properties from the events may be used to adjust the model.

The model may be an equation, artificial neural network, recurrent neural network, convolutional neural network, decision tree, or other machine-readable artificial intelligence structure. The characteristics of the structure available for adjusting during training may vary based on the model selected. For example, if a neural network is the selected model, characteristics may include input elements, network layers, node density, node activation thresholds, weights between nodes, input or output value weights, or the like. If the model is implemented as an equation (e.g., regression), the characteristics may include weights for the input parameters, thresholds, or limits for evaluating an output value, or criterion for selecting from a set of equations.

Once a model is trained, retraining may be included to refine or update the model to reflect additional data or specific operational conditions. The retraining may be based on one or more signals detected by a device described herein or as part of a method described herein. Upon detection of the designated signals, the system may activate a training process to adjust the model as described.

Further examples of machine learning and modeling features which may be included in the embodiments discussed above are described in "A survey of machine learning for big data processing" by Qiu et al. in EURASIP Journal on Advances in Signal Processing (2016) which is hereby incorporated by reference in its entirety.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method, comprising:
   (i) for each baseline machine learning model of a set of baseline machine learning models, with at least one processor:

training that baseline machine learning model based on a plurality of first training samples, wherein the plurality of first training samples includes a plurality of different data types, and wherein training that baseline machine learning model generates a plurality of first predictions for the plurality of first training samples;

generating, for that baseline machine learning model, based on the plurality of first predictions for the plurality of first training samples, a rejection region associated with at least one data type of the plurality of different data types; and processing, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model, wherein a baseline model predictive performance metric for that baseline machine learning model is determined based on the subset of second predictions of that baseline machine learning model, and wherein the plurality of second training samples is associated with a plurality of rejection flags for that baseline machine learning model, wherein each rejection flag of the plurality of rejection flags indicates whether a corresponding second sample of the plurality of second samples is within the rejection region of that baseline machine learning model;

(ii) generating, with the at least one processor, a global rejection region associated with one or more data types of the plurality of different data types based on the rejection region associated with each baseline machine learning model;

(iii) training, with the at least one processor, an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model, wherein training the ensemble machine learning model generates a subset of ensemble predictions for the further subset of second training samples of the plurality of second training samples outside the global rejection region, and wherein an ensemble model predictive performance metric is determined based on the subset of ensemble predictions;

(iv) updating, with the at least one processor, based on the baseline model predictive performance metric for each baseline machine learning model, the set of baseline machine learning models; and (v) repeating, with the at least one processor, (i)-(iv) until there is a single baseline machine learning model in the set of baseline machine learning models or at least one of the ensemble model predictive performance metric satisfies a threshold ensemble model predictive performance, a ratio of the plurality of second training samples outside the global rejection region satisfies a threshold ratio, or any combination thereof.

2. The method of claim 1, wherein, for each baseline machine learning model of the set of baseline machine learning models, generating, for that baseline machine learning model, based on the plurality of first predictions for the plurality of first training samples, the rejection region associated with the at least one data type of the plurality of different data types includes optimizing an objective function defined according to the following equation:

$$\mathrm{argmax}_{(t_{lb})} T_{acc}(t_{lb})$$

$$\text{with } 0 < t_{lb} < 1; \frac{N_{rej}}{N} \le a\%;$$

and any other constraints of interest;

where $t_{lb}$ is a lower bound of the rejection region; $T_{acc}$ is a model performance evaluation metric of that baseline machine learning model calculated using first samples of the plurality of samples outside the rejection region; $N_{rej}$ is a number of the plurality of first samples rejected with scores within the rejection region; N is a number of the plurality of first samples in total; and a % is a user-defined rejection ratio limit for that baseline machine learning model.

3. The method of claim 2, wherein an optimal solution of $t_{lb}$ is obtained using at last one of the following searching or optimization algorithms: a Grid search, a Bayesian optimization, a Simulated annealing, a Genetic algorithm, a Particle swarm optimization, or any combination thereof.

4. The method of claim 1, wherein, for each baseline machine learning model of the set of baseline machine learning models, the plurality of second training samples is associated with a plurality of distance measures, wherein each distance measure of the plurality of distance measures indicates a distance of a corresponding second sample from at least one boundary of the rejection region of that baseline machine learning model, and wherein training, with the at least one processor, the ensemble machine learning model is further based on (d) the plurality of distance measures for the plurality of second samples associated with each baseline machine learning model.

5. The method of claim 1, wherein each baseline machine learning model of the set of baseline machine learning models includes a multi-class classification model for predicting one of a number of classes q, where q is more than two classes, and wherein the rejection region of each baseline machine learning model includes a number q−1 bounds defining the rejection region.

6. The method of claim 1, wherein a meta-model is used to ensemble the set of baseline machine learning models into the ensemble machine learning model.

7. The method of claim 1, further comprising:
(vi) obtaining, with the at least one processor, a current sample;
(vii) determining, with the at least one processor, whether the current sample is within the global rejection region;
(viii) in response to determining that the current sample is outside the global rejection region, automatically processing, with the at least one processor, using the ensemble machine learning model, the current sample to generate a current prediction for the current sample; and
(ix) in response to determining that the current sample is within the global rejection region, automatically flagging, with the at least one processor, the current sample as unable to receive a credible prediction from the ensemble classifier.

8. A system, comprising:
at least one processor configured to:
(i) for each baseline machine learning model of a set of baseline machine learning models:
  train that baseline machine learning model based on a plurality of first training samples, wherein the plurality of first training samples includes a plurality of different data types, and wherein training that baseline machine learning model generates a plurality of first predictions for the plurality of first training samples;
  generate, for that baseline machine learning model, based on the plurality of first predictions for the plurality of first training samples, a rejection region associated with at least one data type of the plurality of different data types; and
  process, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model, wherein a baseline model predictive performance metric for that baseline machine learning model is determined based on the subset of second predictions of that baseline machine learning model, and wherein the plurality of second training samples is associated with a plurality of rejection flags for that baseline machine learning model, wherein each rejection flag of the plurality of rejection flags indicates whether a corresponding second sample of the plurality of second samples is within the rejection region of that baseline machine learning model;
(ii) generate a global rejection region associated with one or more data types of the plurality of different data types based on the rejection region associated with each baseline machine learning model;
(iii) train an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model, wherein training the ensemble machine learning model generates a subset of ensemble predictions for the further subset of second training samples of the plurality of second training samples outside the global rejection region, and wherein an ensemble model predictive performance metric is determined based on the subset of ensemble predictions;
(iv) update, based on the baseline model predictive performance metric for each baseline machine learning model, the set of baseline machine learning models; and
(v) repeat (i)-(iv) until there is a single baseline machine learning model in the set of baseline machine learning models or at least one of the ensemble model predictive performance metric satisfies a threshold ensemble model predictive performance, a ratio of the plurality of second training samples outside the global rejection region satisfies a threshold ratio, or any combination thereof.

9. The system of claim 8, wherein the at least one processor is configured to, for each baseline machine learning model of the set of baseline machine learning models, generate, for that baseline machine learning model, based on the plurality of first predictions for the plurality of first training samples, the rejection region associated with the at least one data type of the plurality of different data types by optimizing an objective function defined according to the following equation:

$$\mathrm{argmax}_{(t_{lb})} T_{acc}(t_{lb})$$
$$\text{with } 0 < t_{lb} < 1; \frac{N_{rej}}{N} \leq a\%;$$

and any other constraints of interest;
where $t_{lb}$ is a lower bound of the rejection region; $T_{acc}$ is a model performance evaluation metric of that baseline machine learning model calculated using first samples of the plurality of samples outside the rejection region; $N_{rej}$ is a number of the plurality of first samples rejected with scores within the rejection region; N is a number of the plurality of first samples in total; and a % is a user-defined rejection ratio limit for that baseline machine learning model.

10. The system of claim 9, wherein an optimal solution of $t_{lb}$ is obtained using at last one of the following searching or optimization algorithms: a Grid search, a Bayesian optimization, a Simulated annealing, a Genetic algorithm, a Particle swarm optimization, or any combination thereof.

11. The system of claim 8, wherein, for each baseline machine learning model of the set of baseline machine learning models, the plurality of second training samples is associated with a plurality of distance measures, wherein each distance measure of the plurality of distance measures indicates a distance of a corresponding second sample from at least one boundary of the rejection region of that baseline machine learning model, and wherein the at least one processor is further configured to train the ensemble machine learning model based on (d) the plurality of distance measures for the plurality of second samples associated with each baseline machine learning model.

12. The system of claim 8, wherein each baseline machine learning model of the set of baseline machine learning models includes a multi-class classification model for predicting one of a number of classes q, where q is more than two classes, and wherein the rejection region of each baseline machine learning model includes a number q−1 bounds defining the rejection region.

13. The system of claim 8, wherein a meta-model is used to ensemble the set of baseline machine learning models into the ensemble machine learning model.

14. The system of claim 8, wherein the at least one processor is further configured to:
  (vi) obtain a current sample;
  (vii) determine whether the current sample is within the global rejection region;
  (viii) in response to determining that the current sample is outside the global rejection region, automatically process, using the ensemble machine learning model, the current sample to generate a current prediction for the current sample; and
  (ix) in response to determining that the current sample is within the global rejection region, automatically flag, the current sample as unable to receive a credible prediction from the ensemble classifier.

15. A computer program product comprising at least one non-transitory computer-readable medium including program instructions that, when executed by at least one processor, cause the at least one processor to:
(i) for each baseline machine learning model of a set of baseline machine learning models:
train that baseline machine learning model based on a plurality of first training samples, wherein the plurality of first training samples includes a plurality of different data types, and wherein training that baseline machine learning model generates a plurality of first predictions for the plurality of first training samples;
generate, for that baseline machine learning model, based on the plurality of first predictions for the plurality of first training samples, a rejection region associated with at least one data type of the plurality of different data types; and
process, with that baseline machine learning model, a subset of second training samples of a plurality of second training samples outside the rejection region of that baseline machine learning model, to generate a subset of second predictions for the subset of second training samples of the plurality of second training samples outside the rejection region of that baseline machine learning model, wherein a baseline model predictive performance metric for that baseline machine learning model is determined based on the subset of second predictions of that baseline machine learning model, and wherein the plurality of second training samples is associated with a plurality of rejection flags for that baseline machine learning model, wherein each rejection flag of the plurality of rejection flags indicates whether a corresponding second sample of the plurality of second samples is within the rejection region of that baseline machine learning model;
(ii) generate a global rejection region associated with one or more data types of the plurality of different data types based on the rejection region associated with each baseline machine learning model;
(iii) train an ensemble machine learning model ensembled based on the set of baseline machine learning models, based on (a) a further subset of second training samples of the plurality of second training samples outside the global rejection region, (b) the plurality of rejection flags for the plurality of second samples associated with each baseline machine learning model, and (c) the subset of second predictions for the subset of second training samples generated for each baseline machine learning model, wherein training the ensemble machine learning model generates a subset of ensemble predictions for the further subset of second training samples of the plurality of second training samples outside the global rejection region, and wherein an ensemble model predictive performance metric is determined based on the subset of ensemble predictions;
(iv) update, based on the baseline model predictive performance metric for each baseline machine learning model, the set of baseline machine learning models; and
(v) repeat (i)-(iv) until there is a single baseline machine learning model in the set of baseline machine learning models or at least one of the ensemble model predictive performance metric satisfies a threshold ensemble model predictive performance, a ratio of the plurality of second training samples outside the global rejection region satisfies a threshold ratio, or any combination thereof.

16. The computer program product of claim 15, wherein the program instructions, when executed by the at least one processor, cause the at least one processor to, for each baseline machine learning model of the set of baseline machine learning models, generate, for that baseline machine learning model, based on the plurality of first predictions for the plurality of first training samples, the rejection region associated with the at least one data type of the plurality of different data types by optimizing an objective function defined according to the following equation:

$$\mathrm{argmax}_{(t_{lb})} T_{acc}(t_{lb})$$

$$\text{with } 0 < t_{lb} < 1; \frac{N_{rej}}{N} \le a\%;$$

and any other constraints of interest;
where $t_{lb}$ is a lower bound of the rejection region; $T_{acc}$ is a model performance evaluation metric of that baseline machine learning model calculated using first samples of the plurality of samples outside the rejection region; $N_{rej}$ is a number of the plurality of first samples rejected with scores within the rejection region; N is a number of the plurality of first samples in total; and a % is a user-defined rejection ratio limit for that baseline machine learning model.

17. The computer program product of claim 16, wherein an optimal solution of $t_{lb}$ is obtained using at last one of the following searching or optimization algorithms: a Grid search, a Bayesian optimization, a Simulated annealing, a Genetic algorithm, a Particle swarm optimization, or any combination thereof.

18. The computer program product of claim 15, wherein, for each baseline machine learning model of the set of baseline machine learning models, the plurality of second training samples is associated with a plurality of distance measures, wherein each distance measure of the plurality of distance measures indicates a distance of a corresponding second sample from at least one boundary of the rejection region of that baseline machine learning model, and wherein the program instructions, when executed by the at least one processor, further cause the at least one processor to train the ensemble machine learning model based on (d) the plurality of distance measures for the plurality of second samples associated with each baseline machine learning model.

19. The computer program product of claim 15, wherein a meta-model is used to ensemble the set of baseline machine learning models into the ensemble machine learning model.

20. The computer program product of claim 15, wherein the program instructions, when executed by the at least one processor, further cause the at least one processor to:
(vi) obtain a current sample;
(vii) determine whether the current sample is within the global rejection region;
(viii) in response to determining that the current sample is outside the global rejection region, automatically process, using the ensemble machine learning model, the current sample to generate a current prediction for the current sample; and
(ix) in response to determining that the current sample is within the global rejection region, automatically flag, the current sample as unable to receive a credible prediction from the ensemble classifier.

\* \* \* \* \*